(12) United States Patent (10) Patent No.: US 12,583,462 B2
Hasegawa (45) Date of Patent: Mar. 24, 2026

(54) DRIVING EVALUATION METHOD AND RECORDING MEDIUM FOR DRIVING EVALUATION ENCODED WITH A PROGRAM

(71) Applicant: TOYO TIRE CORPORATION, Hyogo (JP)

(72) Inventor: Hiroshige Hasegawa, Hyogo (JP)

(73) Assignee: TOYO TIRE CORPORATION, Itami (JP)

( * ) Notice: Subject to any disclaimer, the term of this patent is extended or adjusted under 35 U.S.C. 154(b) by 107 days.

(21) Appl. No.: 18/738,759

(22) Filed: Jun. 10, 2024

(65) Prior Publication Data

US 2024/0425060 A1 Dec. 26, 2024

(30) Foreign Application Priority Data

Jun. 21, 2023 (JP) ................................. 2023-101987
Jun. 21, 2023 (JP) ................................. 2023-101988

(51) Int. Cl.
*B60W 40/09* (2012.01)
*B60W 50/14* (2020.01)
*G06N 3/0464* (2023.01)

(52) U.S. Cl.
CPC ............ *B60W 40/09* (2013.01); *B60W 50/14* (2013.01); *G06N 3/0464* (2023.01); *B60W 2050/146* (2013.01); *B60W 2520/105* (2013.01); *B60W 2530/10* (2013.01); *B60W 2530/20* (2013.01)

(58) Field of Classification Search
CPC ................. B60W 40/09; B60W 50/14; B60W 2050/146; B60W 2520/105; B60W 2530/10; B60W 2530/20; B60W 2552/40; G06N 3/0464
See application file for complete search history.

(56) References Cited

U.S. PATENT DOCUMENTS

2022/0327870 A1* 10/2022 Goto ......................... G07C 5/02

FOREIGN PATENT DOCUMENTS

JP 202055349 A 4/2020

OTHER PUBLICATIONS

An extended Search Report for EP Application No. EP24180356.8, dated Dec. 9, 2024 is attached (7 pages).

* cited by examiner

*Primary Examiner* — Brian A Zimmerman
*Assistant Examiner* — Cal J Eustaquio
(74) *Attorney, Agent, or Firm* — MUNCY, GEISSLER, OLDS & LOWE, P.C.

(57) ABSTRACT

A driving evaluation method includes acquiring a tire force, calculating a proportion, and calculating an evaluation value. The acquiring of the tire force acquires a tire force generating while a vehicle is running. The calculating of the proportion calculates the proportion value by dividing the tire force acquired by the acquiring of the tire force by a load value. The calculating of the evaluation calculates the evaluation value by integrating the tire force for which the proportion value acquired by the calculating of the proportion value belongs to a range defined by a threshold value.

13 Claims, 19 Drawing Sheets

FIG. 5

|  | AT TIME OF BRAKING | AT TIME OF DRIVING |
|---|---|---|
| FR VEHICLE | TIRE FORCE IN FRONT TIRE AT TIME OF BRAKING | TIRE FORCE IN REAR TIRE AT TIME OF DRIVING |
| FF VEHICLE | TIRE FORCE IN FRONT TIRE AT TIME OF BRAKING | TIRE FORCE IN FRONT TIRE AT TIME OF DRIVING |

FIG. 11

| VEHICLE | NUMBER OF LAPS | LAP TIME | EVALUATION VALUE AT TIME OF BRAKING Eb $[\times 10^3]$ | EVALUATION VALUE AT TIME OF DRIVING Ea $[\times 10^3]$ | EVALUATION VALUE E $[\times 10^3]$ |
|---|---|---|---|---|---|
| FR-1 | 1 | 148.3 | 5,255 | 4,591 | 9,846 |
| FR-2 | 2 | 152.7 | 4,639 | 4,031 | 8,670 |
| FR-3 | 3 | 151.4 | 5,013 | 4,218 | 9,231 |
| FF-1 | 1 | 201 | 3,082 | 3,176 | 6,258 |
| FF-2 | 2 | 184 | 3,677 | 3,889 | 7,566 |
| FF-3 | 3 | 184.6 | 3,552 | 4,200 | 7,752 |

FIG. 16

| VEHICLE | NUMBER OF LAPS | LAP TIME | EVALUATION VALUE AT TIME OF BRAKING Eb [×10³] | EVALUATION VALUE AT TIME OF DRIVING Ea [×10³] | EVALUATION VALUE E [×10³] | INDEX VALUE I |
|---|---|---|---|---|---|---|
| FR-1 | 1 | 148.3 | 5,255 | 4,591 | 9,846 | 80 |
| FR-2 | 2 | 152.7 | 4,639 | 4,031 | 8,670 | 70 |
| FR-3 | 3 | 151.4 | 5,013 | 4,218 | 9,231 | 75 |
| FF-1 | 1 | 201 | 3,082 | 3,176 | 6,258 | 51 |
| FF-2 | 2 | 184 | 3,677 | 3,889 | 7,566 | 61 |
| FF-3 | 3 | 184.6 | 3,552 | 4,200 | 7,752 | 63 |

FIG. 17

| VEHICLE | NUMBER OF LAPS | LAP TIME | INDEX VALUE I | INDEX VALUE Ib | INDEX VALUE Ia | DETAIL OF IMPROVEMENT | |
|---|---|---|---|---|---|---|---|
| | | | | | | DRIVING SKILL | TIRE |
| FR-1 | 1 | 148.3 | 80 | 105 | 92 | PROPER BRAKING AND ACCELERATION | TIRE IS PROPER |
| FR-2 | 2 | 152.7 | 70 | 93 | 80 | IMPROVEMENT IN ACCELERATION NEEDED | TIRE WITH HIGH RIGIDITY IN LONGITUDINAL DIREC-TION IS RECOMMENDED |
| FR-3 | 3 | 151.4 | 75 | 100 | 84 | PROPER BRAKING AND ACCELERATION | TIRE IS PROPER |
| FF-1 | 1 | 201 | 51 | 61 | 63 | IMPROVEMENT IN BRAKING AND ACCELERATION IS NEEDED | HIGH GRIP TIRE IS RECOMMENDED |
| FF-2 | 2 | 184 | 61 | 73 | 78 | IMPROVEMENT IN BRAKING IS NEEDED | TIRE WITH HIGH RIGIDITY IN LONGITUDINAL DIREC-TION IS RECOMMENDED |
| FF-3 | 3 | 184.6 | 63 | 71 | 84 | IMPROVEMENT IN BRAKING IS NEEDED | LOWER SCORE TIRE EXCHANGE IS RECOMMENDED |

DRIVING EVALUATION METHOD AND RECORDING MEDIUM FOR DRIVING EVALUATION ENCODED WITH A PROGRAM

CROSS-REFERENCE TO RELATED APPLICATION

This application is based upon and claims the benefit of priority from the prior Japanese Patent Application No. 2023-101987, filed on Jun. 21, 2023, and the prior Japanese Patent Application No. 2023-101988, filed on Jun. 21, 2023, the entire contents of which are incorporated herein by reference.

BACKGROUND

1. Field of the Disclosure

The present disclosure relates to a driving evaluation method, a driving evaluation apparatus, and a driving evaluation program for evaluating the driver's skill of driving the vehicle.

2. Description of the Related Art

Patent Literature 1 describes a driving characteristic evaluation method for evaluating the driving characteristics of the driver. This driving characteristic evaluation method includes a tire force acquisition step for acquiring a tire force acting on the tire of a vehicle at predetermined intervals during driving, and an index derivation step for finding an evaluation index indicating the driving characteristics of the driver of the vehicle based on the statistical dispersion of the plurality of tire forces acquired.

Patent Literature 1: Japanese Patent Application Publication No. 2020-55349

SUMMARY

Incidentally, it is desirable, when a vehicle is driven on a circuit, to evaluate the driving skill by using the tire force acquired during driving and to give advice for improving the lap time around the course. In the evaluation of the statistical dispersion of tire forces by the driving characteristic evaluation method described in Patent Literature 1, it cannot necessarily be said that the amount of tire force produced in a section such as a curve is sufficiently evaluated, and it has been difficult to give sufficient advice for improving the lap time. We have considered that there is room for improvement in performing an evaluation that can derive advantageous information regarding improvement of the skill to drive the vehicle, by performing an evaluation that reliably reflects the tire force produced at the time of braking and driving of the vehicle.

The present disclosure addresses the issue described above, and a purpose thereof is to provide a driving evaluation method, a driving evaluation apparatus, and a driving evaluation program that can derive advantageous information regarding improvement of the driving skill.

An embodiment of the present disclosure relates to a driving evaluation method. The driving evaluation method includes: acquiring a tire force generating while a vehicle is running; calculating a proportion value by dividing the tire force acquired by the acquiring of the tire force by a load value; and calculating an evaluation value by integrating the tire force for which the proportion value acquired by the calculating of the proportion value belongs to a range defined by a threshold value.

Another embodiment of the present disclosure relates to a driving evaluation apparatus. The driving evaluation apparatus includes a tire force acquisition unit that acquires a tire force generating while a vehicle is running, a proportion calculation unit that calculates a proportion value by dividing the tire force acquired by the tire force acquisition unit by a load value, and an evaluation value calculation unit that calculates an evaluation value by integrating the tire force for which the proportion value acquired by the proportion calculation unit belongs to a range defined by a threshold value.

Another embodiment of the present disclosure relates to a driving evaluation program. The driving evaluation program includes computer-implemented modules including: a tire force acquisition module that acquires a tire force generating while a vehicle is running; a proportion calculation module that calculates a proportion value by dividing the tire force acquired by the tire force acquisition module by a load value; and an evaluation value calculation module that calculates an evaluation value by integrating the tire force for which the proportion value acquired by the proportion calculation module belongs to a range defined by a threshold value.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 5 is a chart showing ranges of integration in FR vehicles and FF vehicles;

FIG. 11 is a chart showing examples of evaluation values of the tire force calculated in FR vehicles and FF vehicles;

FIG. 16 is a chart showing index values calculated by the index value calculation unit;

FIG. 17 is a chart showing index values calculated by the index value calculation unit and the detail of improvement;

DETAILED DESCRIPTION

Figure 1:
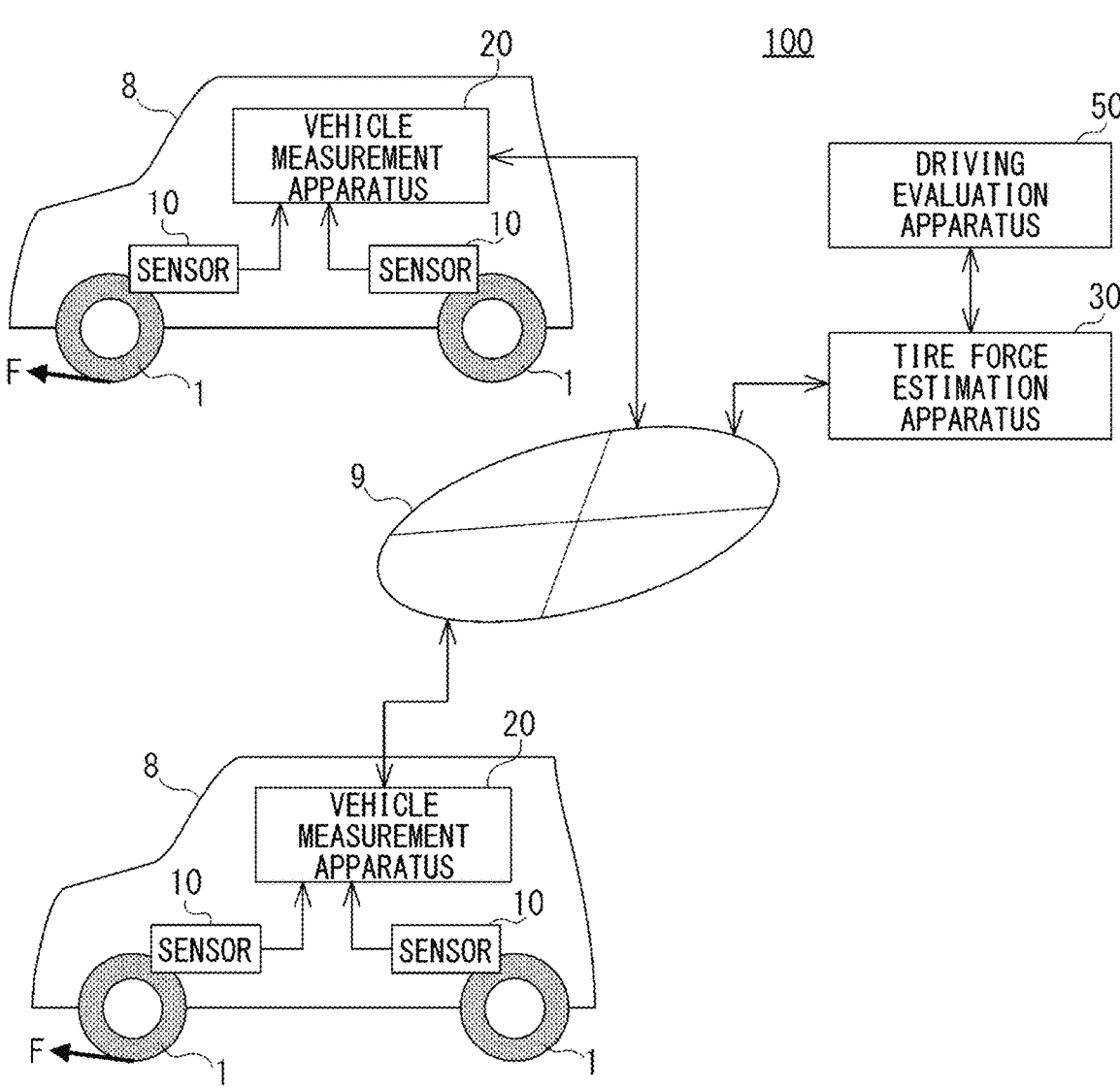
FIG. 1 is a schematic diagram showing an outline of a driving evaluation system according to embodiment 1 including a driving evaluation apparatus.

The invention will now be described by reference to the preferred embodiments. This does not intend to limit the scope of the present invention, but to exemplify the invention. Hereinafter, the present disclosure will be described based on preferred embodiments with reference to FIGS. 1 to 20. Identical or like constituting elements and members shown in the drawings are represented by identical symbols and a duplicate description will be omitted as appropriate. The dimension of members in the drawings shall be enlarged or reduced as appropriate to facilitate understanding. Those of the members that are not material to the description of the embodiments are omitted in the drawings.

Embodiment 1

FIG. 1 is a schematic diagram showing an outline of a driving evaluation system 100 according to embodiment 1 including a driving evaluation apparatus 50. The driving evaluation system 100 includes a sensor 10 provided in each tire 1 mounted on a vehicle 8, a vehicle measurement apparatus 20, a tire force estimation apparatus 30, and a driving evaluation apparatus 50.

The sensor 10 measures the physical quantity of the tire 1 such as acceleration and strain, tire inflation pressure, and tire temperature in the tire 1. The vehicle measurement apparatus 20 stores the physical quantity of the tire 1 measured by the sensor 10 in time series and transmits the physical quantity to the tire force estimation apparatus 30 via a communication network 9. For example, the vehicle 8 is driven on a circuit, and the physical quantity of the tire 1 during driving is stored in time series by the vehicle measurement apparatus 20 and is transmitted to the tire force estimation apparatus 30 after the driving is completed.

The tire force estimation apparatus 30 estimates a tire force based on data measured by the sensor 10 and received from the vehicle measurement apparatus 20. The tire force estimation apparatus 30 uses the data measured by the sensor 10 for calculation to estimate the tire force, but may acquire information such as vehicle acceleration measured on side of the vehicle 8 and use the information for calculation to estimate the tire force. The tire force estimation apparatus 30 estimates, for example, the tire force of the vehicle 8 caused to run on a circuit.

The driving evaluation apparatus 50 evaluates the driving skill based on the tire force estimated by the tire force estimation apparatus 30 and provides advice information for improvement of the driving skill. The driving evaluation apparatus 50 integrates, for example, the tire force produced while the vehicle 8 is running on a circuit, and evaluates how much tire force is produced to run the vehicle 8.

There may be a plurality of vehicles 8 instead of one vehicle. The driving evaluation apparatus 50 can use a large number of vehicles 8 as targets of comparison and can derive more advantageous information regarding improvement of the driving skill, by evaluating the situation of tire force in a larger number of vehicles 8.

Figure 2:
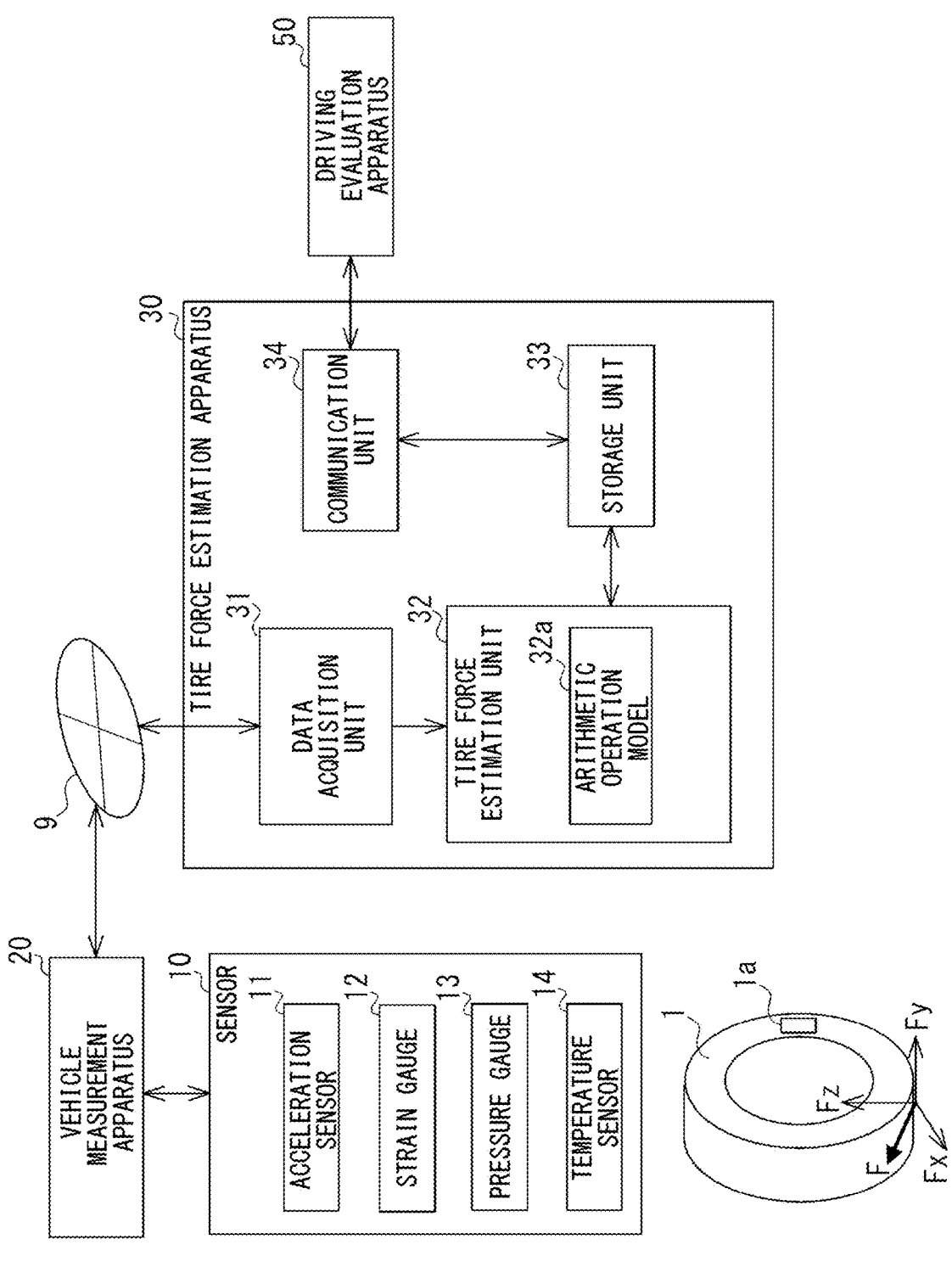
FIG. 2 is a block diagram showing a functional configuration of the tire force estimation apparatus.

FIG. 2 is a block diagram showing a functional configuration of the tire force estimation apparatus 30. The sensor 10 includes an acceleration sensor 11, a strain gauge 12, a pressure gauge 13, a temperature sensor 14, and the like, and measures the physical quantity in the tire 1. These sensors measure physical quantities related to deformation and movement of the tire 1 as the physical quantity of the tire 1. The vehicle measurement apparatus 20 stores the physical quantity produced in the tire 1 and measured by the sensor 10 and transmits the physical quantity to the tire force estimation apparatus 30.

The acceleration sensor 11 and the strain gauge 12 move mechanically along with the tire 1 and measure the acceleration and amount of strain produced in the tire 1, respectively. The acceleration sensor 11 is provided in, for example, the tread, side, and bead of the tire 1, in the wheel, etc. and measures the acceleration in the three axes, i.e., the circumferential, axial, and radial directions in the tire 1.

The strain gauge 12 is provided in the tread, side, bead, etc. of the tire 1 and measures the strain at the location of provision. Further, the pressure gauge 13 and the temperature sensor 14 are provided in, for example, the air valve of the tire 1 and measure the tire inflation pressure and tire temperature, respectively. The temperature sensor 14 may be provided directly in the tire 1 to measure the temperature of the tire 1 accurately. An RFID 11*a* or the like to which unique identification information is assigned may be attached to the tire 1 for identification of the tire.

The tire force estimation apparatus 30 includes a data acquisition unit 31, a tire force estimation unit 32, a storage unit 33, and a communication unit 34. The tire force estimation apparatus 30 is an information processing apparatus such as a PC (personal computer). The parts in the tire force estimation apparatus 30 are implemented in hardware such as an electronic processing circuit comprised of an electronic element exemplified by a CPU of a computer and a mechanical component, and in software such as a computer program. FIG. 2 depicts functional blocks implemented by the cooperation of these parts. Therefore, it will be understood by those skilled in the art that the functional blocks may be implemented in a variety of manners by a combination of hardware and software.

The data acquisition unit 31 acquires, by wireless communication, etc., information on the acceleration, strain, inflation pressure, and temperature measured by the sensor 10 from the vehicle measurement apparatus 20. The communication unit 34 communicates with the driving evaluation apparatus 50 by wire or wirelessly and transmits tire force data estimated by the tire force estimation unit 32 to the driving evaluation apparatus 50.

The tire force estimation unit 32 includes an arithmetic operation model 32*a*, inputs the information from the data acquisition unit 31 to the arithmetic operation model 32*a*, and estimates a tire force F. As shown in FIG. 2, the tire force F has components in the three axial directions, i.e., a longitudinal force Fx in the longitudinal direction of the tire 1, a lateral force Fy in the lateral direction, and a load Fz in the vertical direction. The tire force estimation unit 32 may calculate all of these components in the three axial directions, calculate one of the components, or an arbitrary combination of two components.

Figure 3:
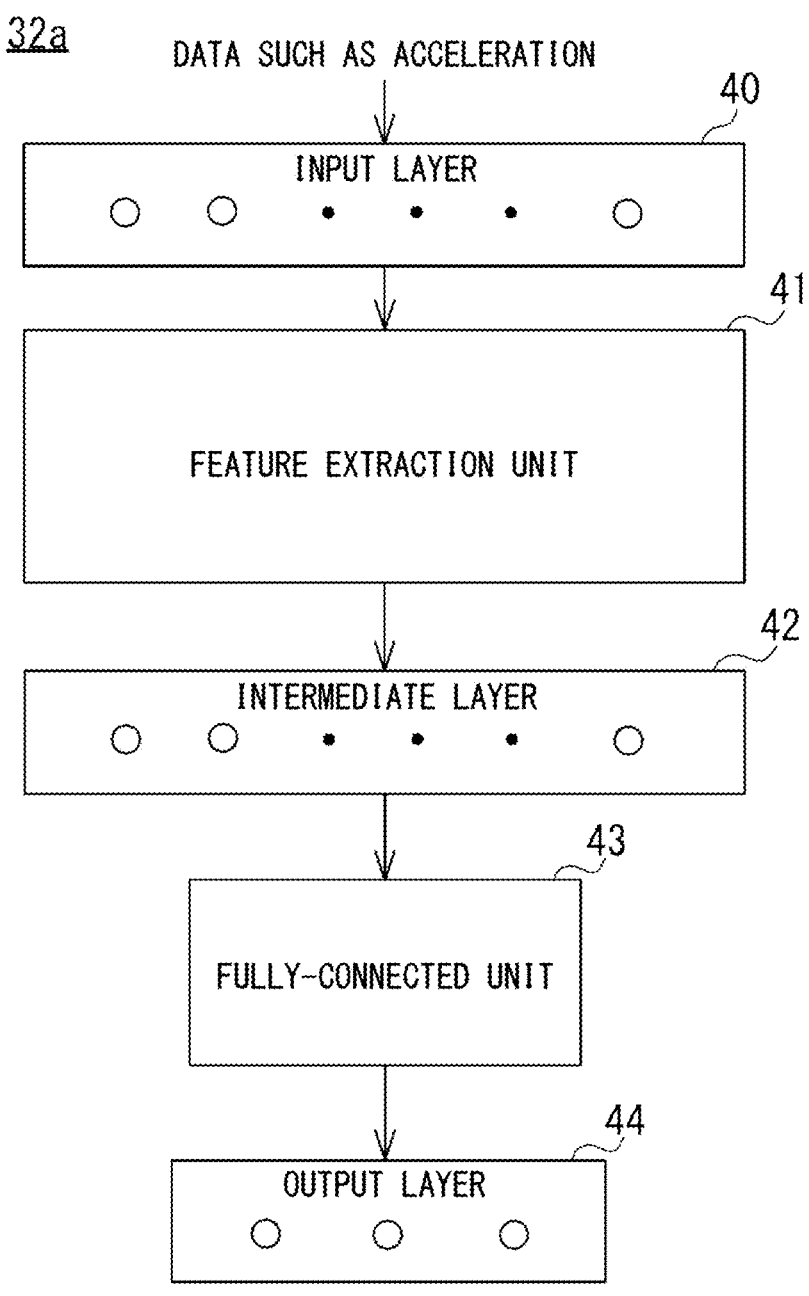
FIG. 3 is a schematic diagram showing a configuration of the arithmetic operation model.

The arithmetic operation model 32*a* uses a learning type model such as a neural network. FIG. 3 is a schematic diagram showing a configuration of the arithmetic operation model 32*a*. The arithmetic operation model 32*a* is of a convolutional neural network (CNN) type and is a learning type model provided with convolution operation and pooling operation used in the so-called LeNet, which is a prototype of CNN. FIG. 3 shows an example in which acceleration data in the three axial directions is used as the input data input to the arithmetic operation model 32*a*, and the tire forces in the three axial directions are output.

The arithmetic operation model 32*a* includes an input layer 40, a feature extraction unit 41, an intermediate layer 42, a fully-connected unit 43, and an output layer 44. Time series data for acceleration in the three axial directions acquired by the data acquisition unit 31 is input to the input layer 40. The acceleration data is measured by the sensor 10 on a time-series basis. Data for a predetermined time segment is extracted by a window function for use as the input data.

Acceleration measured in the tire 1 exhibits periodicity per rotation of the tire 1. The time segment of input data extracted by the window function may, for example, be a period of time corresponding to the period of rotation of the tire 1 to impart the input data itself with a periodicity. The window function may extract input data in a time segment shorter or longer than one rotation of the tire 1. The arithmetic operation model 32*a* can be trained so long as the extracted input data at least includes periodical information.

The feature extraction unit 41 extracts a feature amount by using a convolution operation, a pooling operation, etc. and transmits the feature amount to the nodes of the intermediate layer 42. The feature extraction unit 41 executes a convolutional operation by applying a plurality of filters to the input data. The convolutional operation executes the convolutional operation by moving the filter relative to the time series input data such as acceleration data. In the pooling operation, the data from the convolutional operational is subjected to a maximum pooling operation that, for example, selects the larger of the two values arranged in a time sequence. The feature extraction unit 41 extracts a feature amount by repeating a convolutional operation, a pooling operation, etc.

The fully-connected unit 43 fully connects the data from the nodes of the intermediate layer 42 in one or a plurality of layers and outputs the tire forces Fx, Fy, and Fz to the nodes of the output layer 44. The fully-connected unit 43 executes an operation via fully-connected paths on which weighted liner operation, etc. is executed. In addition to a linear operation, the fully-connected unit 43 may execute a non-linear operation by using an activating function, etc.

In addition to the tire forces in the three axial directions, information such as the moments around the three axes produced in the tire 1 may be output to the nodes of the output layer 44. The tire force estimated by the arithmetic operation model 32*a* is stored in the storage unit 33. The storage unit 33 is a storage apparatus comprised of a solid state drive (SSD), a hard disk, a CD-ROM, a DVD, etc. and stores, for example, the tire force estimated in each tire 1 mounted on the vehicle 8 caused to run on the circuit.

The arithmetic operation model 32*a* can be trained by mounting, on an actual vehicle, the tire 1 of a specification adapted to the vehicle and by test driving the vehicle. The specification of the tire 1 includes information related to tire performance such as tire size, tire width, tire profile, tire strength, tire outer diameter, road index, and year/month/date of manufacturing.

Figure 4:
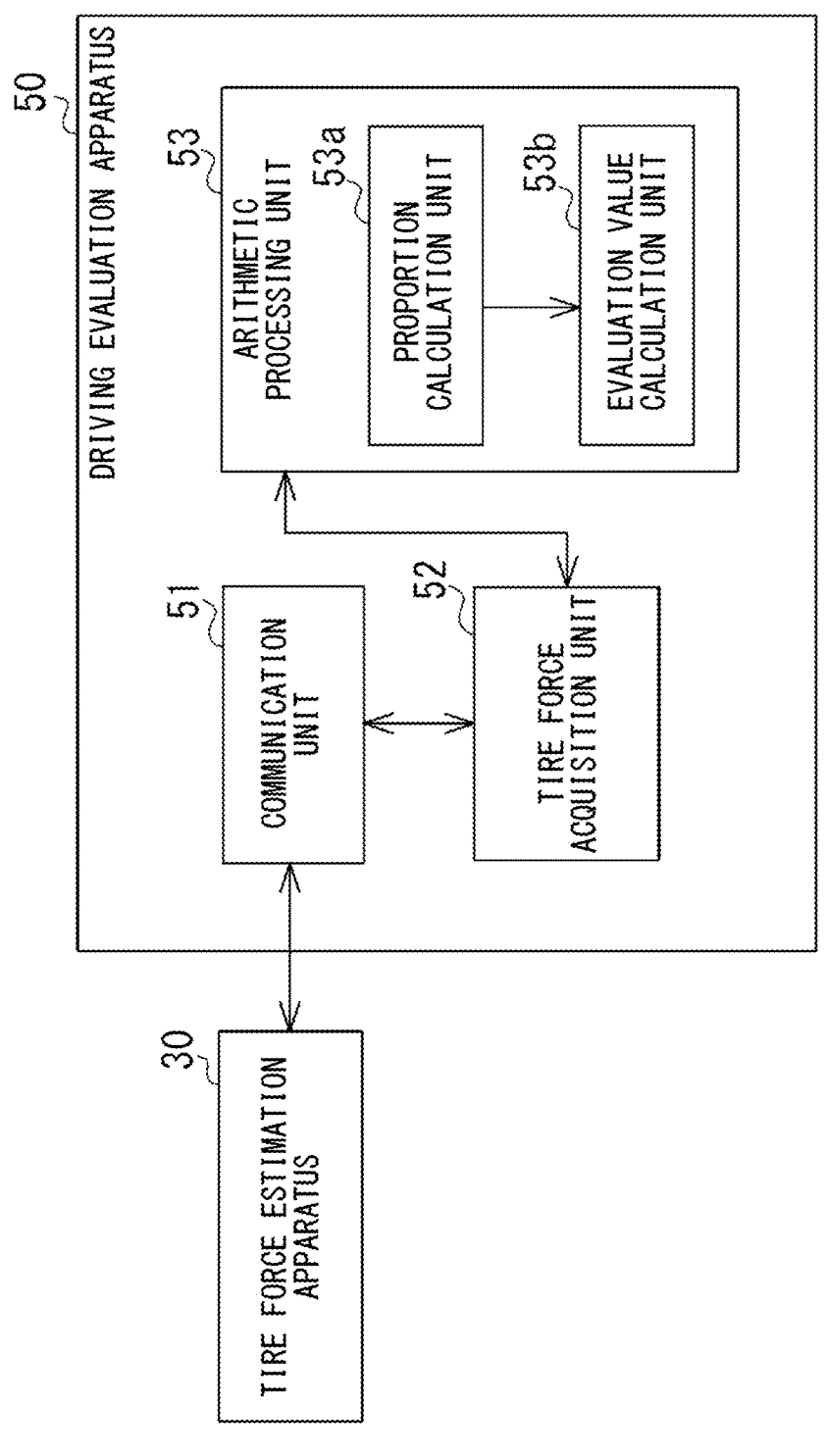
FIG. 4 is a block diagram showing a functional configuration of the driving evaluation apparatus.

FIG. 4 is a block diagram showing a functional configuration of the driving evaluation apparatus 50. The driving evaluation apparatus 50 includes a communication unit 51, a tire force acquisition unit 52, and an arithmetic processing unit 53. The driving evaluation apparatus 50 is an information processing apparatus such as a PC (personal computer). The parts in the driving evaluation apparatus 50 are implemented in hardware such as an electronic processing circuit comprised of an electronic element exemplified by a CPU of a computer and a mechanical component, and in software such as a computer program. FIG. 4 depicts functional blocks implemented by the cooperation of these parts. Therefore, it will be understood by those skilled in the art that the functional blocks may be implemented in a variety of manners by a combination of hardware and software.

The communication unit 51 communicates with the tire force estimation apparatus 30 by wire or wirelessly. The tire force acquisition unit 52 receives and acquires data for the tire force estimated by the tire force estimation apparatus 30 via the communication unit 51. The tire force acquired by the tire force acquisition unit 52 is exemplified by the tire force in the three axial directions estimated in each tire 1 mounted on the vehicle 8 that has run on the circuit.

The arithmetic processing unit 53 includes a proportion calculation unit 53*a* and an evaluation value calculation unit 53*b*. The proportion calculation unit 53*a* calculates, for each tire 1 mounted on the vehicle 8, proportion values Rx and Ry by dividing, of the tire forces in the three axial directions, longitudinal force Fx and the lateral force Fy by the load Fz.

The proportion values Rx and Ry derived from dividing the longitudinal force Fx and the lateral force Fy by the load Fz are values of the same dimension as the friction coefficient value. In the case the proportion values Rx and Ry are larger than the maximum friction coefficient between the road surface and the tire 1, the tire 1 is basically considered to be in a slipping state.

When the time required for one lap is 200 seconds and the tire force is estimated every 0.2 seconds in one tire 1 of the vehicle 8 that has run on the circuit, for example, the proportion values Rx and Ry are obtained as 1000 items of data each. Further, when a total of four tires 1 of the front and rear wheels are mounted on the vehicle 8, the proportion values Rx and Ry are obtained as 4000 items of data each.

When the proportion values Rx and Ry are large values close to but not exceeding the maximum friction coefficient, it means the vehicle 8 is driven to produce the tire force up to a limit that does not cause the tire 1 to slip. When the proportion values Rx and Ry are values far smaller than the maximum friction coefficient, conversely, it means that the tire 1 of the vehicle 8 does not slip, but the vehicle 8 is being driven without producing a sufficient tire force.

The evaluation value calculation unit 53*b* calculates an evaluation value E by integrating the tire force for which the proportion values Rx and Ry belong to a range defined by a predetermined threshold value. The range defined by the predetermined threshold value is basically defined as a range in which the absolute value of the proportion values Rx and Ry is greater than the predetermined threshold value (e.g., 0.5). The predetermined threshold is not limited to 0.5.

The range defined by the predetermined threshold value is defined as a range in which the proportion value Rx of the longitudinal force Fx is 0 or more (or more than 0) in consideration of the braking of the vehicle 8. Further, the range defined by the predetermined threshold value is defined as a range in which the proportion value Rx of the longitudinal force Fx is 0 or less (or less than 0) in consideration of the driving of the vehicle 8. The range defined by the predetermined threshold value can be said to be a target range of the tire force in which the tire force is integrated to calculate the evaluation value.

The evaluation value calculation unit 53b extracts tire force based on information on the weight balance and the drive wheels of the vehicle 8 and defines a target range in which the tire force is integrated to determine an evaluation value. FIG. 5 is a chart showing ranges of integration in FR vehicles and FF vehicles. It is assumed that the weight balance of the vehicle 8 is such that an engine is mounted on the front side of the vehicle and that the center of gravity is located away from the longitudinal center and toward the front side of the vehicle 8.

In the case of an FR vehicle in which the drive wheels are on the rear side, the tire force on the front wheel side contributes more to the braking of the vehicle 8 than that of the rear wheel side when the vehicle 8 is braked. The evaluation value Eb is calculated by integrating the tire force of the tire 1 on the front wheel side at the time of braking. The evaluation value Eb is the integrated value of the tire force determined by focusing on braking. Further, when an FR vehicle is driven, the tire force on the rear wheel side contributes more to the driving of the vehicle 8 than that of the front wheel side. The evaluation value Ea is calculated by integrating the tire force of the tire 1 on the rear wheel side at the time of driving. The evaluation value Ea is the integrated value of the tire force determined by focusing on driving. The overall evaluation value E is given by E=Eb+Ea.

In the case of an FF vehicle in which the drive wheels are on the front side, the tire force on the front wheel side contributes more to the braking of the vehicle 8 than that of the rear wheel side when the vehicle 8 is braked. The evaluation value Eb is calculated by integrating the tire force of the tire 1 on the front at the time of braking. Further, when an FF vehicle is driven, the tire force on the front wheel side contributes more than that of the rear wheel side. The evaluation value Ea is calculated by integrating the tire force of the tire 1 on the front wheel side at the time of driving.

When calculating the evaluation value by integrating the tire force, the evaluation value calculation unit 53b integrates the magnitude of a tire force Fs derived from vector synthesis of, of the tire forces in the three axial directions, the longitudinal force Fx and the lateral force Fy. The evaluation value E of a FR vehicle is given by the following expression.

$$E = Eb + Ea = \sum(\text{Fs at the time of braking the front tire}) + \quad (1)$$
$$\sum(\text{Fs at the time of driving the rear tire})$$

where Eb=Σ (Fs at the time of braking the front tire), Ea=Σ (Fs at the time of driving the rear tire).

Further, the evaluation value E of an FF vehicle is given by the following expression.

$$E = Eb + Ea = \sum(\text{Fs at the time of braking the front tire}) + \quad (2)$$
$$\sum(\text{Fs at the time of driving the front tire})$$

where Eb=Σ (Fs at the time of braking the front tire), Ea=Σ (Fs at the time of driving the front tire).

The driving evaluation apparatus 50 provides the user with the evaluation values E, Eb, and Ea calculated by the evaluation value calculation unit 53b by displaying them on a display apparatus or the like. Further, the driving evaluation apparatus 50 may simultaneously display a lap time and the like, and provides the user with a relationship between the evaluation values E, Eb, Ea, and the lap time.

Figure 6:
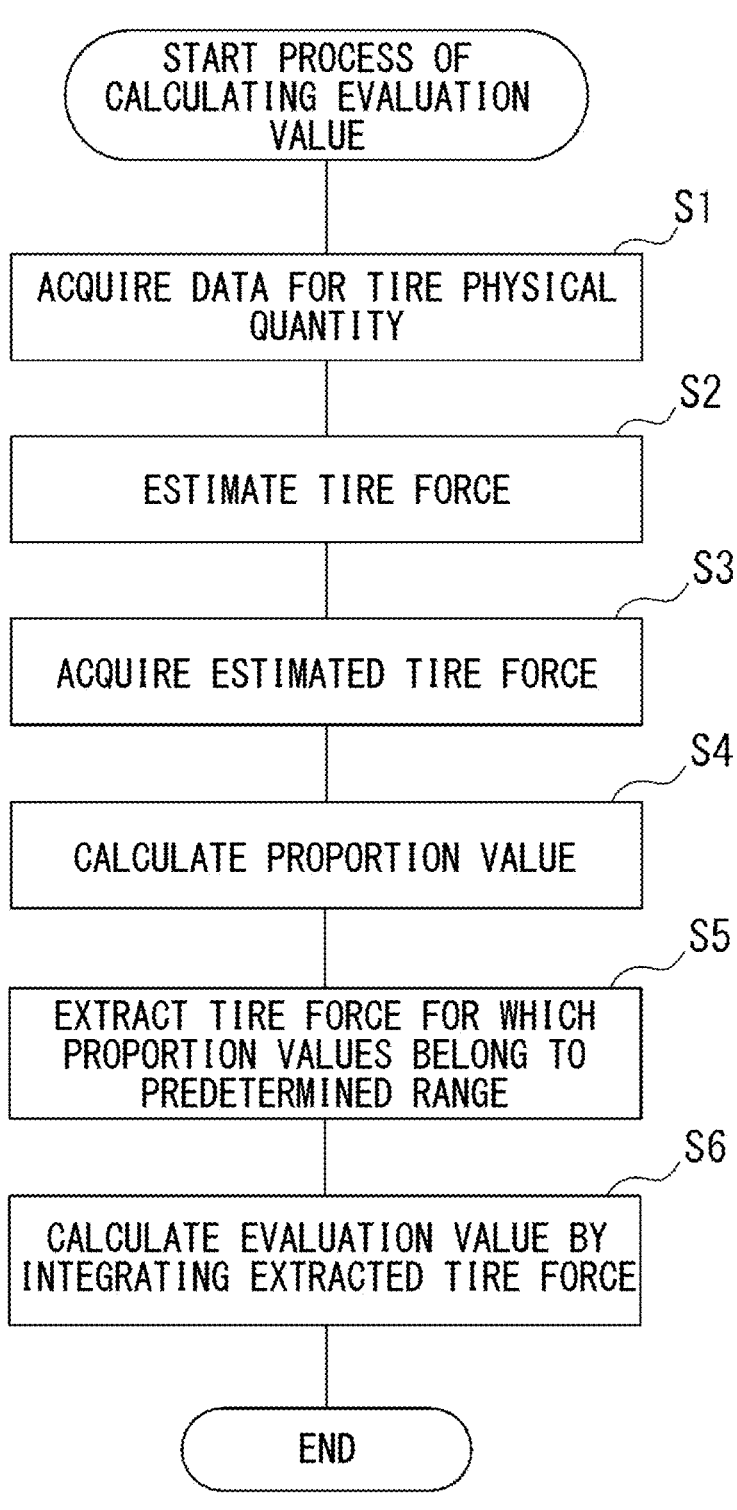
FIG. 6 is a flowchart showing steps of calculating the evaluation value by the tire force estimation apparatus and the driving evaluation apparatus.

A description will now be given of the operation of the driving evaluation apparatus 50. FIG. 6 is a flowchart showing steps of calculating the evaluation value by the tire force estimation apparatus 30 and the driving evaluation apparatus 50. The data acquisition unit 31 of the tire force estimation apparatus 30 acquires data for the physical quantity of the tire 1 measured by the sensor 10 (S1). The tire force estimation unit 32 estimates the tire force in the three axial directions using the arithmetic operation model 32a (S2). The tire force estimation unit 32 estimates, for example, the tire force produced in each tire 1 mounted on the vehicle caused to run on a circuit while the vehicle is running on the circuit.

The tire force acquisition unit 52 of the driving evaluation apparatus 50 acquires tire force data estimated by the tire force estimation unit 32 of the tire force estimation apparatus 30 (S3). The proportion calculation unit 53a calculates the proportion values Rx and Ry by dividing, of the tire forces, the longitudinal force Fx and the lateral force Fy by the load Fz (S4).

The evaluation value calculation unit 53b extracts the tire force for which the proportion values Rx and Ry belong to the range defined by the predetermined threshold value (S5). The evaluation value calculation unit 53b calculates the evaluation value E by integrating the tire force extracted in step S5 (S6), and ends the process. In the case of an FR vehicle, for example, the evaluation value calculation unit 53b calculates the evaluation value Eb at the time of braking such that Eb=C (Fs at the time of braking of the front tire), calculates the evaluation value Ea at the time of driving such that Ea=C (Fs at the time of driving the rear tire), and calculates the overall evaluation value E by adding Eb and Ea.

Figure 7:
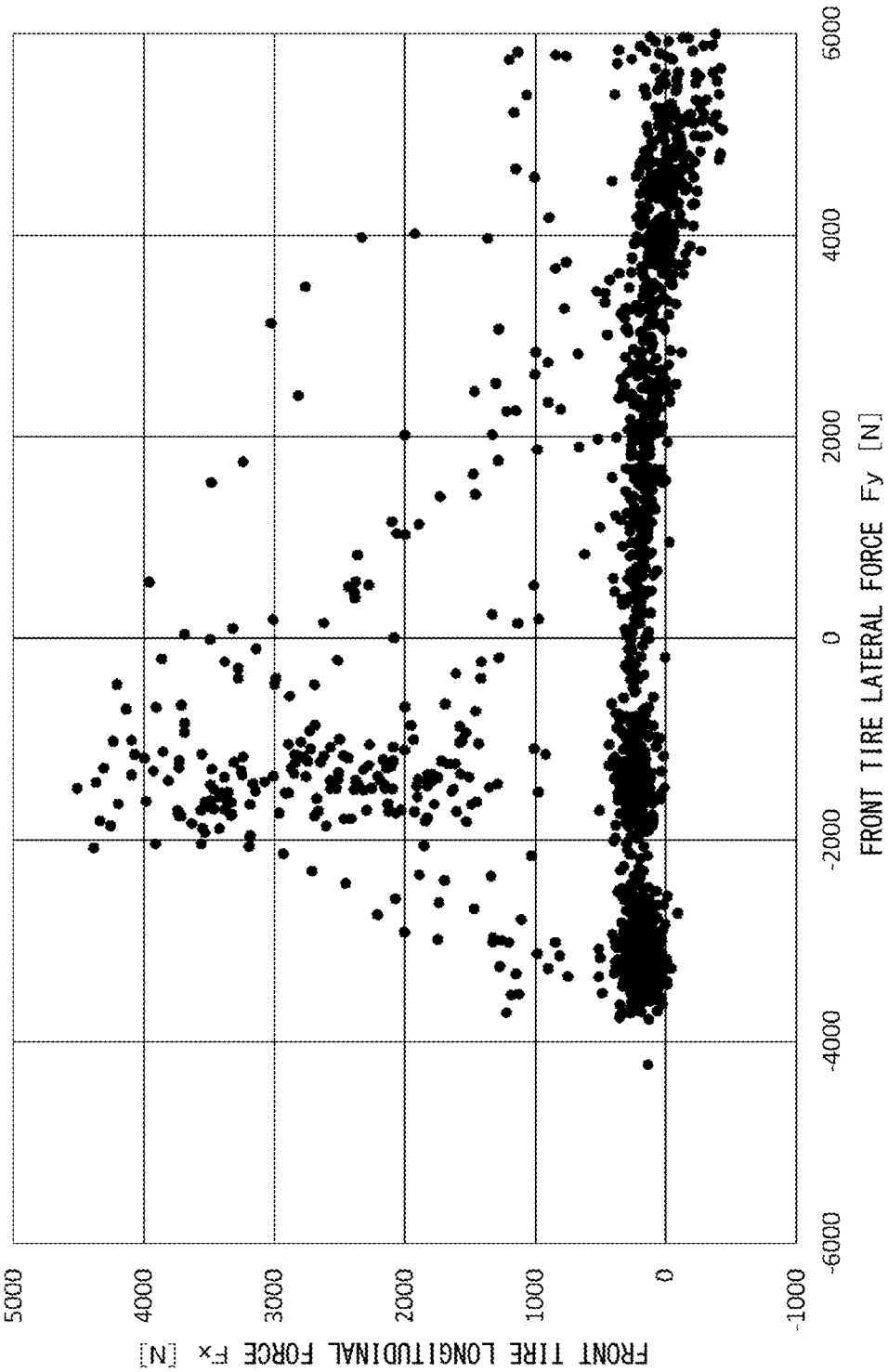
FIG. 7 is a graph showing an example of the tire force of the front tire.
Figure 8:
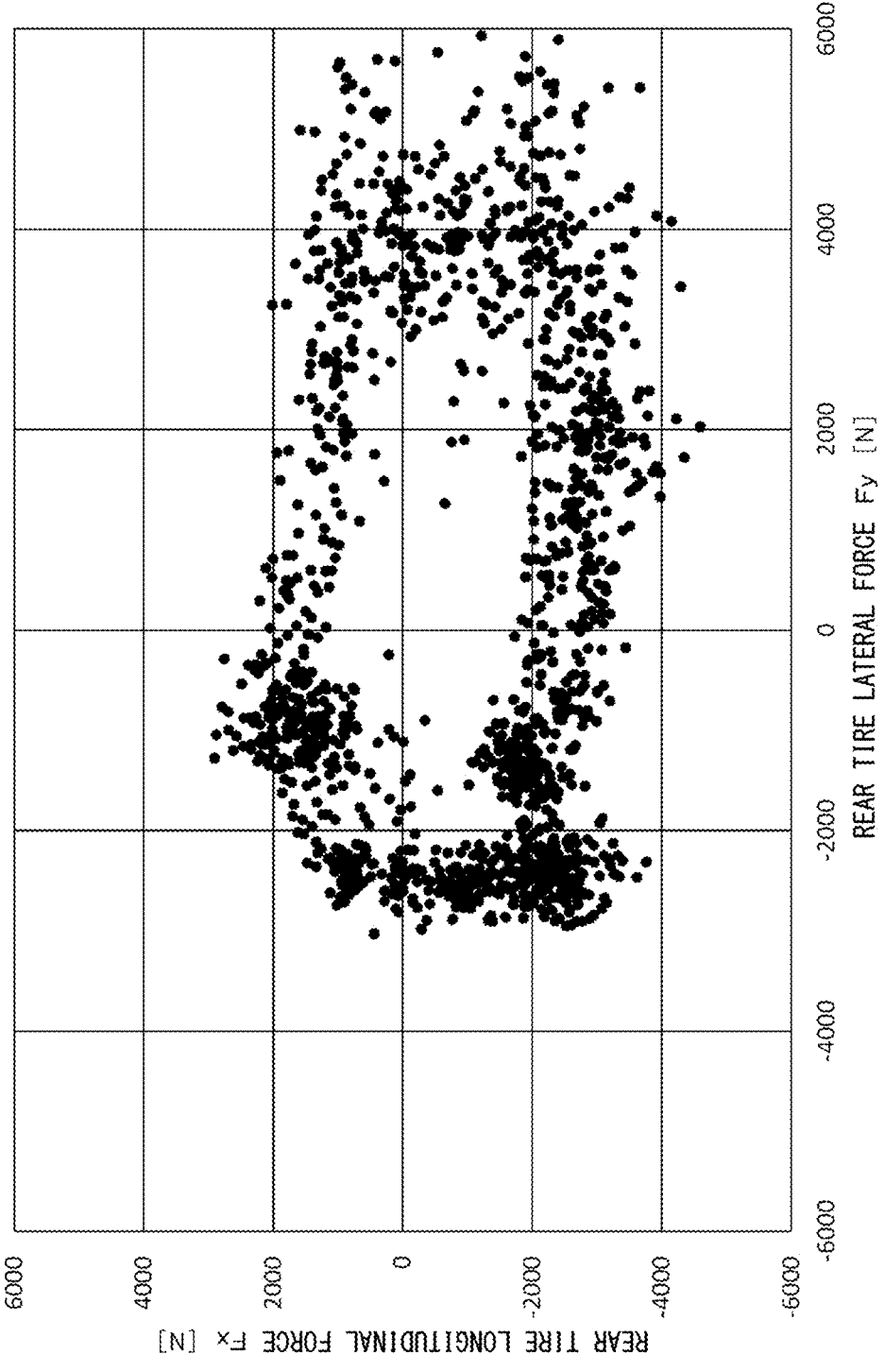
FIG. 8 is a graph showing an example of the tire force of the rear tire.

FIG. 7 is a graph showing an example of the tire force of the front tire, and FIG. 8 is a graph showing an example of the tire force of the rear tire. In FIGS. 7 and 8, the horizontal axis represents the lateral force Fy, the vertical axis represents the longitudinal force Fx, and the time-series estimated longitudinal force Fx and lateral force Fy are plotted. The tire force shown in FIGS. 7 and 8 is estimated in, for example, each tire 1 mounted on a FR vehicle caused to run one lap around the circuit.

In the front tire shown in FIG. 7, the longitudinal force Fx is mostly produced to show a positive value, although some of it shows a negative value, indicating that the longitudinal force Fx of a positive value is acting as a braking force. In the front tire shown in FIG. 7, negative and positive values of the lateral force Fy are distributed across the boundary of 0 N, indicating polarities that conform to both left and right curves.

In the rear tire shown in FIG. 8, the longitudinal force Fx of a negative value acts as a driving force to accelerate the vehicle, and the longitudinal force Fx of a positive value acts as a braking force. In the rear tire shown in FIG. 8, the lateral force Fy is distributed on both sides across the boundary of 0 N, indicating polarities that conform to both left and right curves.

Figure 9:
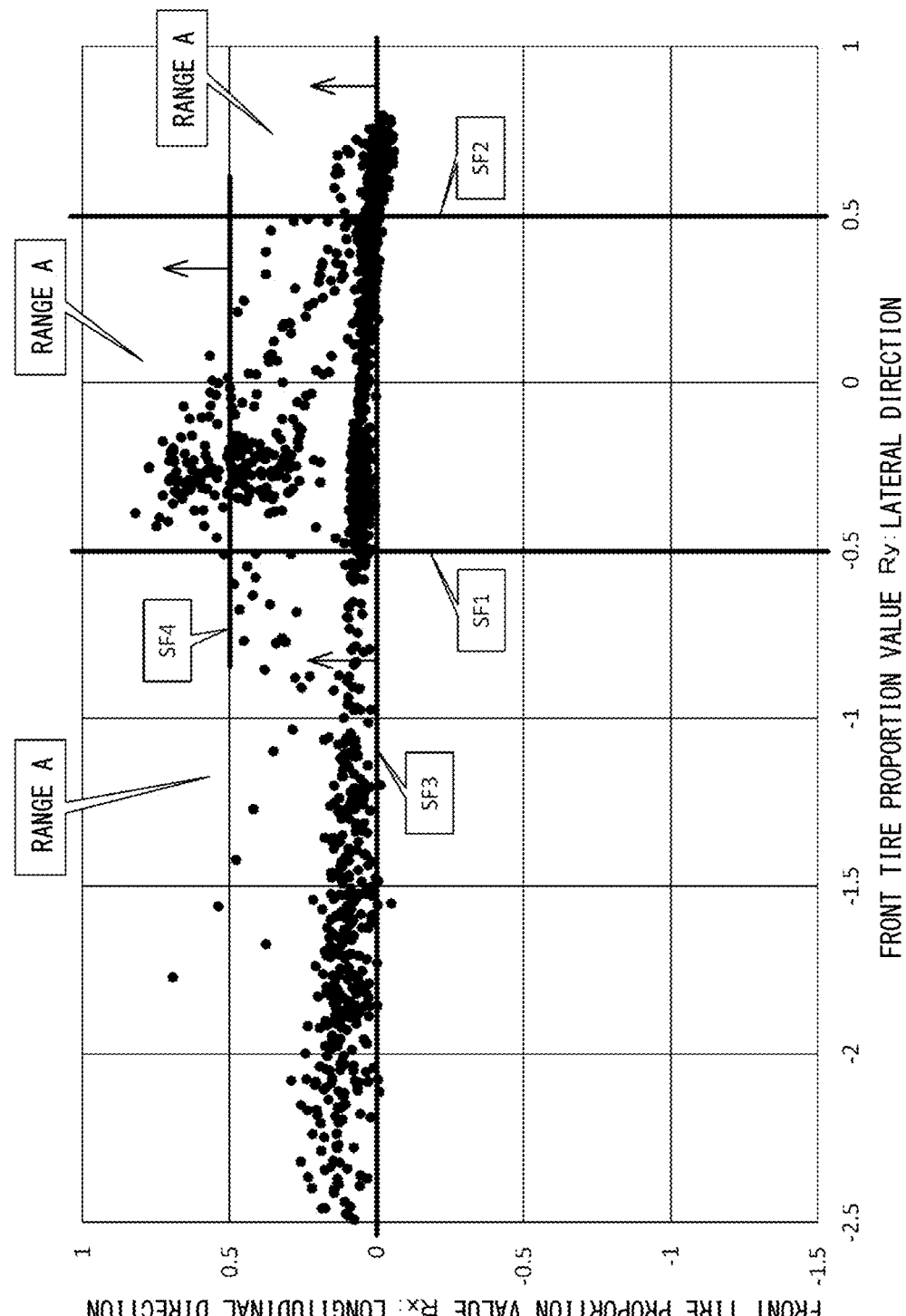
FIG. 9 is a graph showing examples of the proportion values Rx and Ry of the front tire.
Figure 10:
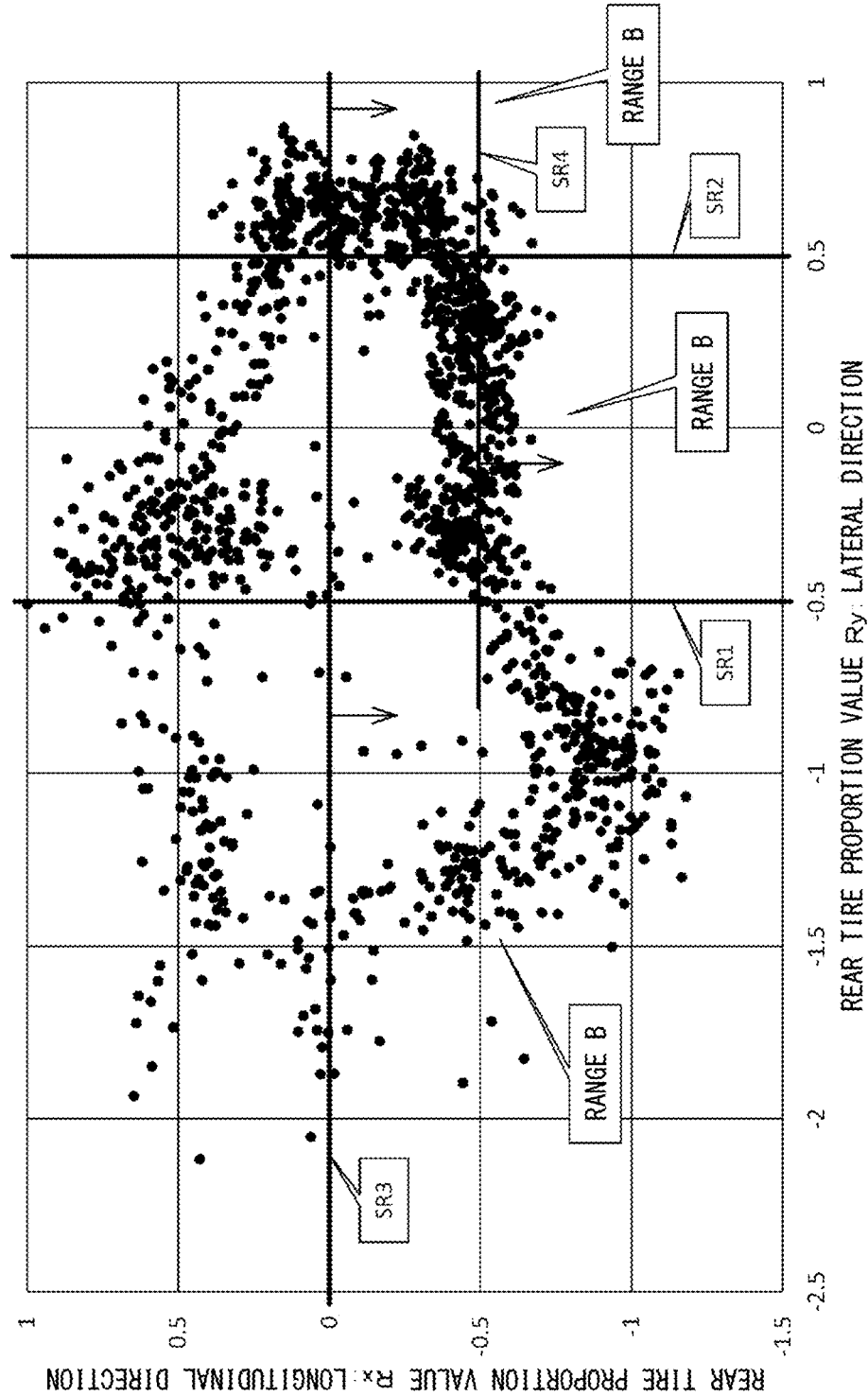
FIG. 10 is a graph showing examples of the proportion values Rx and Ry of the rear tire.

FIG. 9 is a graph showing examples of the proportion values Rx and Ry of the front tire, and FIG. 10 is a graph showing examples of the proportion values Rx and Ry of the rear tire. In FIGS. 9 and 10, the horizontal axis represents the proportion value Ry, the vertical axis represents the proportion value Rx, and the proportion value Rx and the lateral force Ry calculated in time series are plotted. The proportion values shown in FIGS. 9 and 10 are estimated in, for example, each tire 1 mounted on a FR vehicle caused to run one lap around the circuit.

In the front tire shown in FIG. 9, the proportion value Rx is mostly produced to show a positive value, although some of it shows a negative value, indicating that the tire force is acting as a braking force. Further, in the rear tire shown in FIG. 10, the negative proportion value Rx shows that the tire force is acting as a driving force. Further, in the rear tire shown in FIG. 10, the positive proportion value Rx shows that the tire force is acting as a braking force.

The evaluation value calculation unit 53*b* extracts those of the proportion values Rx and Ry plotted as shown in FIGS. 9 and 10 that are within the range defined by the predetermined threshold value. The evaluation value calculation unit 53*b* extracts tire force corresponding to the extracted proportion values Rx and Ry.

The evaluation value calculation unit 53*b* extracts, in the front tire, proportion values in a range A represented as a sum set of a range in which the proportion value Ry is equal to or less than the first threshold value SF1=−0.5 or equal to or more than the second threshold value SF2=+0.5 and in which the proportion value Rx is equal to or more than the third threshold value SF3=0, and a range in which the proportion value Rx is equal to or more than the fourth threshold value SF4=+0.5.

As indicated by the arrows in FIG. 9, the range in which the proportion value is extracted is a range in which the proportional value Rx is above the third threshold value SF3, in the case the proportion value Ry is equal to or less than the first threshold value SF1 or equal to or more than the second threshold value SF2. In the case the proportion value Ry is larger than the first threshold value SF1 and smaller than the second threshold value SF2, the range in which the proportion value is extracted is a range in which the proportion value Rx is above the fourth threshold value SF4.

The evaluation value calculation unit 53*b* calculates the evaluation value Eb=C (Fs at the time of braking of the front tire) in the FR vehicle by extracting and integrating the tire force corresponding to the proportion values Rx and Ry extracted in the front tire.

The evaluation value calculation unit 53*b* extracts, in the rear tire, proportion values in a range B represented as a sum set of a range in which the proportion value Ry is equal to or less than the first threshold value SR1=−0.5 or equal to or more than the second threshold value SR2=+0.5 and in which the proportion value Rx is equal to or less than the third threshold value SR3=0, and a range in which the proportion value Rx is equal to or less than the fourth threshold value SR4=−0.5.

As indicated by the arrows in FIG. 10, the range in which the proportion value is extracted is a range in which the proportional value Rx is below the third threshold value SR3, in the case the proportion value Ry is equal to or less than the first threshold value SR1 or equal to or more than the second threshold value SR2. In the case the proportion value Ry is larger than the first threshold value SR1 and smaller than the second threshold value SR2, the range in which the proportion value is extracted is a range in which the proportion value Rx is below the fourth threshold value SR4.

The evaluation value calculation unit 53*b* calculates the evaluation value Ea=C (Fs at the time of driving the rear tire) in the FR vehicle by extracting and integrating the tire force corresponding to the proportion values Rx and Ry extracted in the rear tire.

The case of an FF vehicle will be described. The evaluation value calculation unit 53*b* calculates the evaluation value Eb at the time of driving according to the tire force produced in the front tire. As in the case of a FR vehicle, the evaluation value calculation unit 53*b* calculates the evaluation value Eb by integrating the tire force Fs of the front tire for which the proportion values Rx and Ry belong to the range A defined by the first threshold value SF1, the second threshold value SF2, the third threshold value SF3, and the fourth threshold value SF4.

In the case of an FF vehicle, the evaluation value calculation unit 53*b* calculates the evaluation value Ea at the time of driving according to the tire force produced in the front tire. The evaluation value calculation unit 53*b* calculates the evaluation value Ea by integrating the tire force Fs of the front tire for which the proportion values Rx and Ry belong to the range B defined by the first threshold value SR1, the second threshold value SR2, the third threshold value SR3, and the fourth threshold value SR4.

FIG. 11 is a chart showing examples of evaluation values of the tire force calculated in FR vehicles and FF vehicles. FIG. 11 shows evaluation values and lap times of three FR vehicles and three FF vehicles. The vehicle FR-1, which has the shortest lap time among the FR vehicles, has the highest overall evaluation value E comprised of the evaluation value Eb at the time of braking and the evaluation value Ea at the time of driving.

Figure 12:
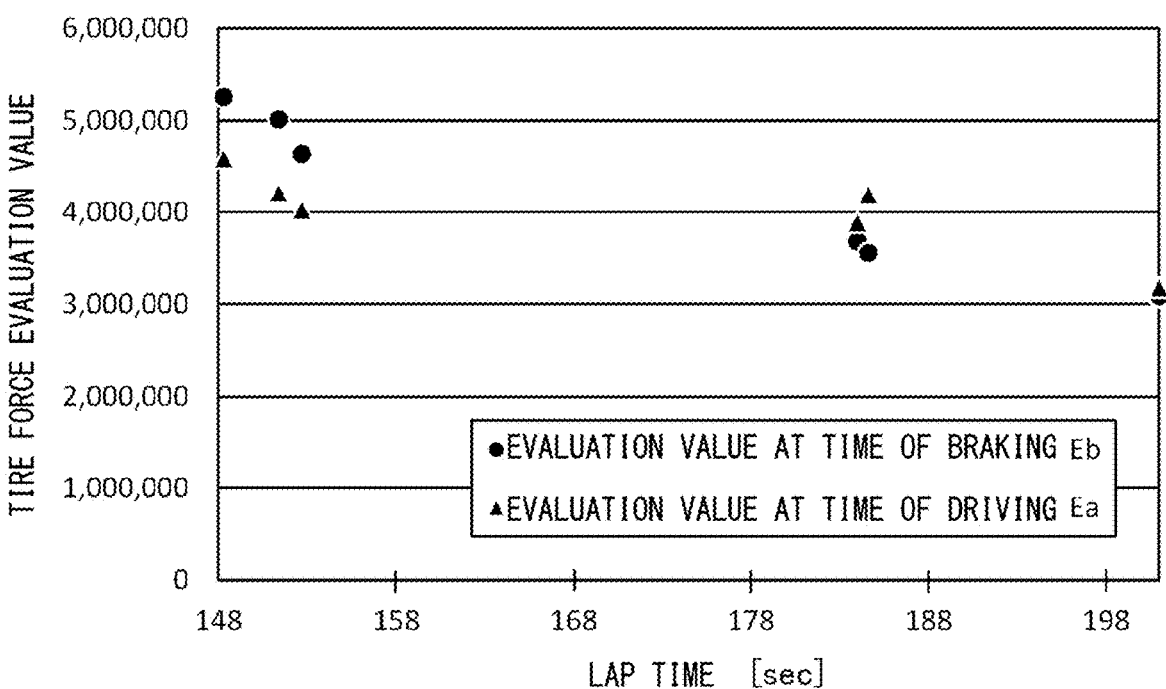
FIG. 12 is a graph showing a correlation between the evaluation values Eb and Ea and the lap time.
Figure 13:
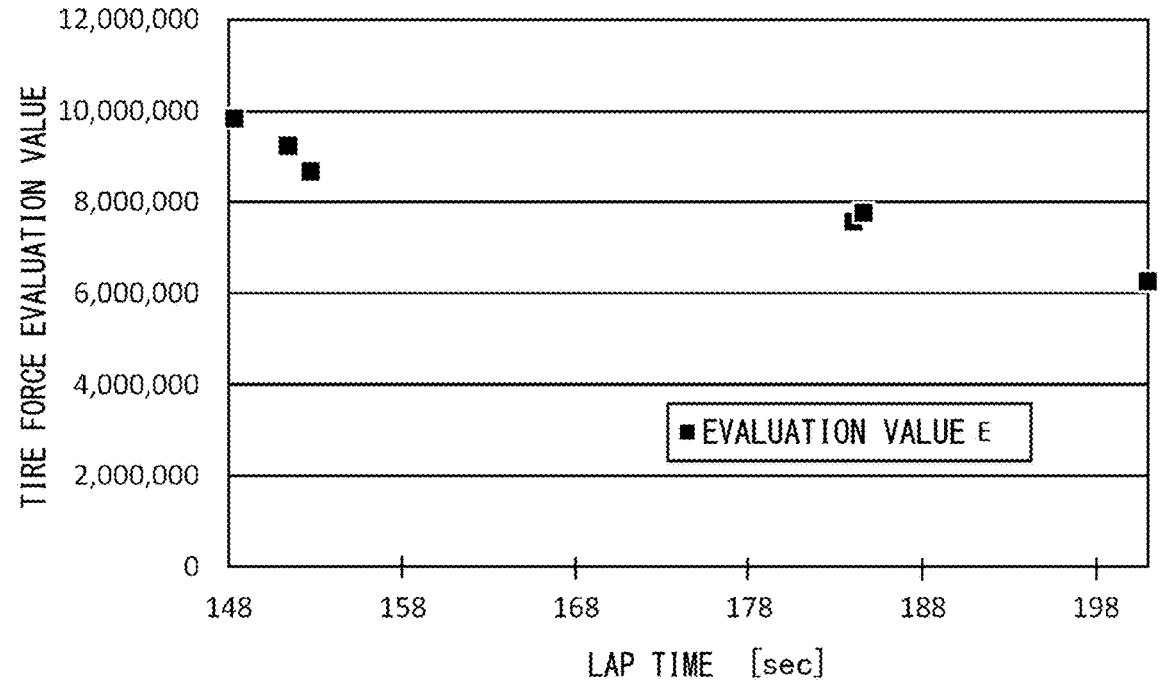
FIG. 13 is a graph showing a correlation between the overall evaluation value E and the lap time.

FIG. 12 is a graph showing a correlation between the evaluation values Eb and Ea and the lap time, and FIG. 13 is a graph showing a correlation between the overall evaluation value E and the lap time. As shown in FIG. 12, it can be seen that the driving operation is performed such that the shorter the lap time, the larger the evaluation value Eb at the time of braking and the evaluation value Ea at the time of driving, and the larger the tire force produced at the time of braking and at the time of driving. It can be seen that the driving operation is performed such that the longer the lap time, the smaller the evaluation value Eb at the time of braking and the evaluation value Ea at the time of driving, and such that a sufficient tire force is not produced at the time of braking and at the time of driving. The driving operation is an operation performed by the driver such as steering, braking, acceleration.

As shown in FIG. 13, it can be seen that the driving operation is performed such that the shorter the lap time, the larger the overall evaluation value E, and the larger tire force produced. It can be seen that the driving operation is performed such that the longer the lap time, the smaller the overall evaluation value E, and such that a sufficient tire force is not produced at the time of braking and at the time of driving.

The driving evaluation apparatus 50 calculates, using the evaluation value calculation unit 53*b*, the evaluation values Ea, Eb, and E from the tire force for which the proportion values Rx and Ry belong to the range defined by the predetermined threshold value. For example, the lap time of a vehicle running on a circuit is shortened by using the tire force to the maximum at the time of braking and at the time of driving. The evaluation value calculation unit 53*b* can derive information that reflects the tire force and is advantageous for improvement of the driving skill, by calculating the evaluation value by integrating the tire force generating when the proportion values Rx and Ry are equal to or higher than a certain level defined by the threshold value.

The evaluation value calculation unit 53*b* of the driving evaluation apparatus 50 calculates the evaluation value Eb at the time of braking and the evaluation value Ea at the time of driving, using the tire force extracted based on at least one of the weight balance or the drive wheel of the vehicle. Thereby, the driving evaluation apparatus 50 can extract the tire force influential on the braking and driving (acceleration) of the vehicle, and derive more accurate information that leads to improvement of the driving skill.

In the case the vehicle is a rear-wheel drive FR vehicle, the evaluation value calculation unit 53b calculates the evaluation value by integrating the tire force in the front tire at the time of braking and the tire force in the rear tire at the time of driving. Thereby, the driving evaluation apparatus 50 can extract the influential tire according to the drive wheel, and derive more accurate information that leads to improvement of the driving skill.

Further, in the case the vehicle is a front-wheel drive FF vehicle, the evaluation value calculation unit 53b calculates the evaluation value by integrating the tire force in the front tire at the time of braking and the tire force in the front tire at the time of driving. Thereby, the driving evaluation apparatus 50 can extract the influential tire according to the drive wheel, and derive more accurate information that leads to improvement of the driving skill.

The evaluation value calculation unit 53b calculates the proportion values Rx and Ry by dividing the longitudinal force Fx and the lateral force Fy by the load Fz, and extracts the tire force for which the proportion values Rx and Ry belong to the range defined by the predetermined threshold value. Thereby, the driving evaluation apparatus 50 can distinguish between the time of braking time and the time of driving by referring to the proportion value Rx in the longitudinal direction, and can extract the tire force influential on vehicle driving by referring to the proportion values Rx and Ry equal to or higher than a predetermined level.

In the above-described example, a case where the weight balance of the vehicle is located away from the longitudinal center and toward the front side of the vehicle has been described. In the case the weight balance is close to the rear side of the vehicle, the evaluation value calculation unit 53b is considered to derive advantageous information that leads to improvement of the driving skill by including the braking force in the rear tire in the calculation of the evaluation value.

In the case of a four-wheel drive vehicle, the evaluation value calculation unit 53b may extract the tire force in both the front tire and the rear tire to calculate the evaluation value at the time of driving. Further, when the tire force in either the front tire or the rear tire greatly contributes to the drive of the vehicle, as determined by the weight balance, the evaluation value calculation unit 53b may calculate the evaluation value by using the tire force in one of the tire forces.

Embodiment 2

Figure 14:
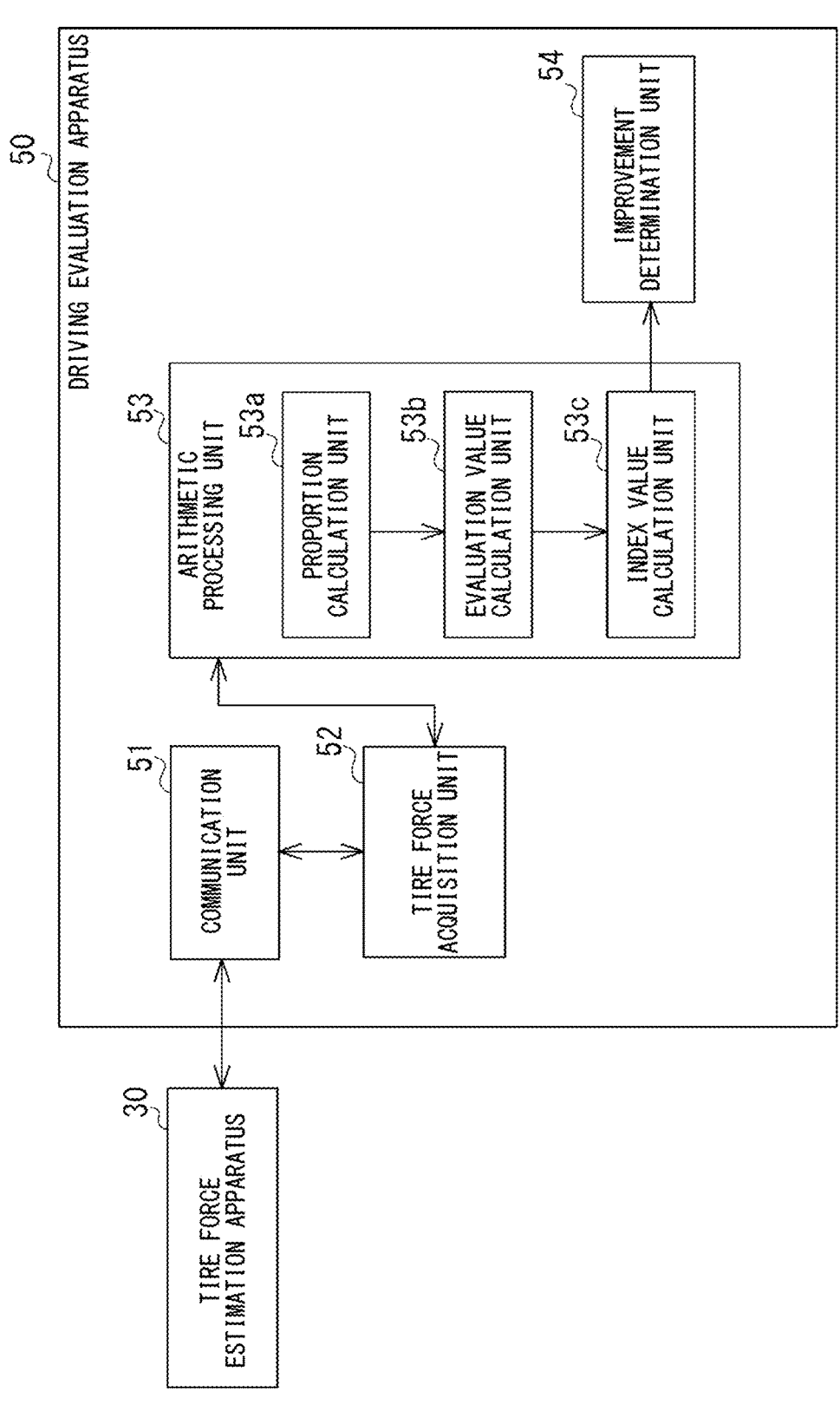
FIG. 14 is a block diagram showing a functional configuration of the driving evaluation apparatus according to embodiment 2.

FIG. 14 is a block diagram showing a functional configuration of the driving evaluation apparatus 50 according to embodiment 2. In addition to the features of the driving evaluation apparatus 50 according to embodiment 1, the driving evaluation apparatus 50 according to embodiment 2 includes an index value calculation unit 53c and an improvement determination unit 54.

The index value calculation unit 53c calculates an index value I from the evaluation value calculated by the evaluation value calculation unit 53b, based on a predetermined reference value. The index value calculation unit 53c may use, for example, an evaluation value E that has already been acquired, as the predetermined reference value. The index value calculation unit 53c may, for example, define, of the evaluation values E acquired in a plurality of vehicles, the evaluation value E of one of the vehicles as the reference value, and determine a proportion derived from dividing the evaluation value E of another vehicle by the reference value as the index value I.

Alternatively, the index value calculation unit 53c may, for example, define one of the evaluation values E acquired multiple times in one vehicle as the reference value, and determine a proportion derived from dividing another evaluation value E by the reference value as the index value I.

The index value calculation unit 53c may define the index value I of the evaluation value E adopted as the reference value to be 100%. Alternatively, the index value calculation unit 53c may calculate the index value I by further multiplying an attenuation amount such as 0.8 by the value derived from dividing the evaluation value by the reference value. In this case, the index value calculation unit 53c calculates, for example, the index value I of the evaluation value E adopted as the reference value to be 80%, taking into account the attenuation amount.

Further, the index value calculation unit 53c may calculate the index value Ib at the time of braking and the index value Ia at the time of driving, respectively, based on predetermined reference value for the evaluation value Eb at the time of braking and the evaluation value Ea at the time of driving.

The improvement determination unit 54 determines the detail of improvement of the driving skill based on the index values Ib, Ia and I calculated by the index value calculation unit 53c. The detail of improvement related to the driving skill covers brake operation and accelerator operation, and the detail related to the tire covers tire performance (e.g., rubber rigidity, grip performance, etc.).

The improvement determination unit 54 may rank the index values Ib, Ia, and I calculated by the index value calculation unit 53c in multiple stages, and set the detail of improvement for each rank in advance. The improvement determination unit 54 may determine which rank the index values Ib, Ia, and I calculated by the index value calculation unit 53c are included in, and may present the detail of improvement set for the determined rank.

Figure 15:
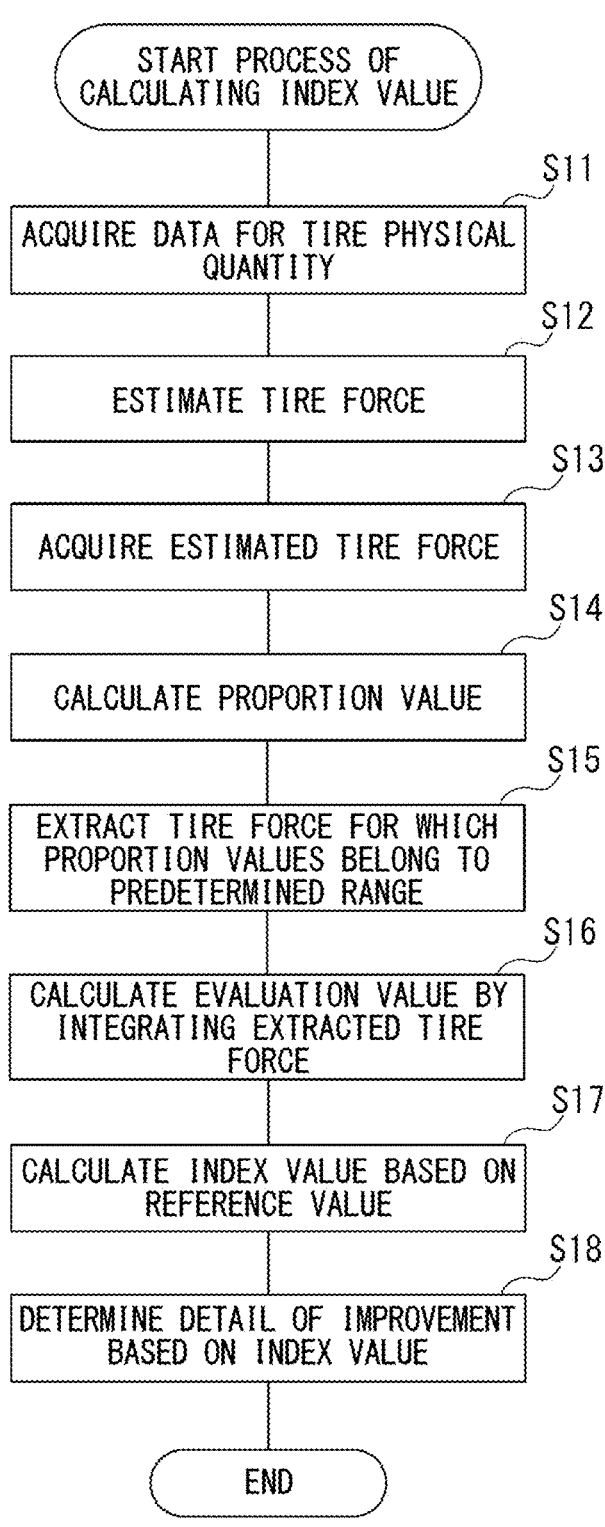
FIG. 15 is a flowchart showing steps for calculating the index value by the tire force estimation apparatus and the driving evaluation apparatus.

The operation of the driving evaluation apparatus 50 will now be described. FIG. 15 is a flowchart showing steps for calculating the index value by the tire force estimation apparatus 30 and the driving evaluation apparatus 50. Referring to FIG. 15, steps S11 to S16 are equivalent to steps S1 to S6 shown in FIG. 6, and a description thereof is omitted for brevity.

The index value calculation unit 53c calculates the index value I from the evaluation value calculated in step S16, based on a predetermined reference value (S17). The index value calculation unit 53c uses, for example, the evaluation value E that has already been acquired as the predetermined reference value. The improvement determination unit 54 determines the detail of improvement of the driving skill based on the index values Ib, Ia, and I calculated in step S17 (S18) and ends the process.

FIG. 16 is a chart showing index values calculated by the index value calculation unit 53c. The index value calculation unit 53c uses the overall evaluation value E of the FR-1 vehicle with the shortest lap time as the reference value, divides each evaluation value E by the reference value, and multiplies the result by the attenuation amount 0.8 to calculate the overall index value I (percentage). As shown in FIG. 16, the index value I of other vehicles such as FR-2 is small compared to that of the FR-1 (the index value is 80) with a short lap time, and it can be seen that there is room for improvement in operations such as braking and acceleration.

By calculating the index value I in the index value calculation unit $53c$, the driving evaluation apparatus 50 can derive information that reflects the tire force and is advantageous for improvement of the driving skill, which makes it easy to recognize an aspect of the driving skill that should be improved.

FIG. 17 is a chart showing index values calculated by the index value calculation unit $53c$ and the detail of improvement. FIG. 17 presents, in addition to the overall index value I, the index value Ib at the time of braking and the index value Ia at the time of driving.

For calculation of the index value Ib at the time of braking and the index value Ia at the time of driving, the overall evaluation values Eb and Ea of the FR-1 vehicle with the shortest lap time may be used as the reference value, or the evaluation value of another vehicle may be used as the reference value. In the example shown in FIG. 17, the index value calculation unit $53c$ calculates the index value Ib at the time of braking and the index value Ia at the time of driving of each vehicle, using the evaluation value Eb of the vehicle FR-3 at the time of braking as the reference value (without an attenuation amount).

The driving evaluation apparatus 50 can provide information on the evaluation of tire force in brake and accelerator operations in an easy-to-recognize manner, by calculating the index values Ib and Ia in the index value calculation unit $53c$.

As shown in FIG. 17, the improvement determination unit 54 ranks the index values Ib and Ia and determines the detail of improvement related to the driving skill. The improvement determination unit 54 determines, for example, that "the brake and accelerator operations are proper" for the vehicle FR-1 showing highly ranked index values Ib and Ia. The determination result in this case may be an expression such as "the tire is used properly" for the vehicle FR-1.

The improvement determination unit 54 determines that "both the brake and accelerator operations require improvement" for the vehicle FF-1 showing low-ranking index values Ib and Ia. The determination result in this case may be an expression such as "the tire should be used more when braking and accelerating" for the vehicle FF-1. Thus, the driving evaluation apparatus 50 can provide information on the detail of improvement related to the driving skill in a format that is easy to recognize, based on the index value calculated by the index value calculation unit $53c$.

Further, as shown in FIG. 17, the detail of improvement provided by the improvement determination unit 54 may include the detail related to the tire. The improvement determination unit 54 additionally indicates, as the detail of improvement, "a tire with high rigidity in the longitudinal direction is recommended" for the FR-2 having a high index value Ib at the time of braking and a slightly low index value Ia at the time of driving. In addition, the improvement determination unit 54 additionally indicates, as the detail of improvement, "a high grip tire is recommended" for the vehicle FF-1 having a low index value Ib at the time of braking and a low index value Ia at the time of driving.

Variation

In the above-described embodiments 1 and 2, the tire force estimation apparatus 30 and the driving evaluation apparatus 50 are configured to be separate but may be integrated into the driving evaluation apparatus 50 and configured as one apparatus. In this case, the driving evaluation apparatus 50 is configured to include the components of the tire force estimation apparatus 30.

Estimation of the tire force is not limited to the method using a learning type arithmetic operation model as in case of the tire force estimation apparatus 30 described above, and the tire force may be estimated by using, for example, a mechanical motion model of a vehicle.

In embodiment 2, the detail of improvement is not limited to an expression such as "the brake and accelerator operations are proper". An expression meaning encouraging a brake operation or an accelerator operation that further increase the tire force can be used.

Embodiment 3

Figure 18:
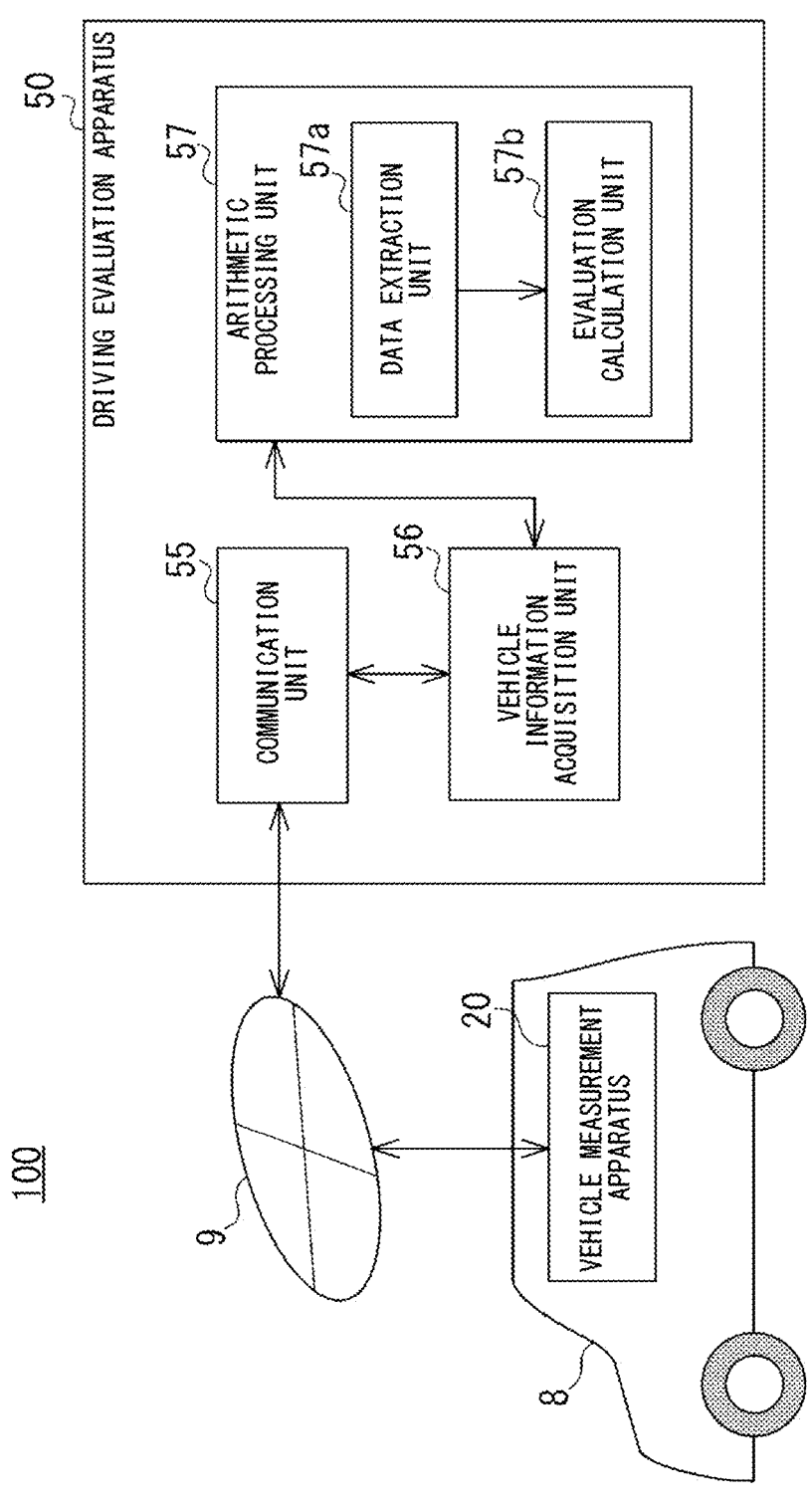
FIG. 18 is a block diagram showing a functional configuration of a driving evaluation system according to embodiment 3 including the driving evaluation apparatus.

FIG. 18 is a block diagram showing a functional configuration of a driving evaluation system 100 according to embodiment 3 including the driving evaluation apparatus 50. The driving evaluation system 100 according to embodiment 3 uses the vehicle measurement apparatus 20 to measure the acceleration produced in the vehicle and transmits the acceleration to the driving evaluation apparatus 50. The acceleration produced in the vehicle is measured by, for example, an acceleration sensor or a gyro sensor fixed to the body of the vehicle, etc.

Figure 19:
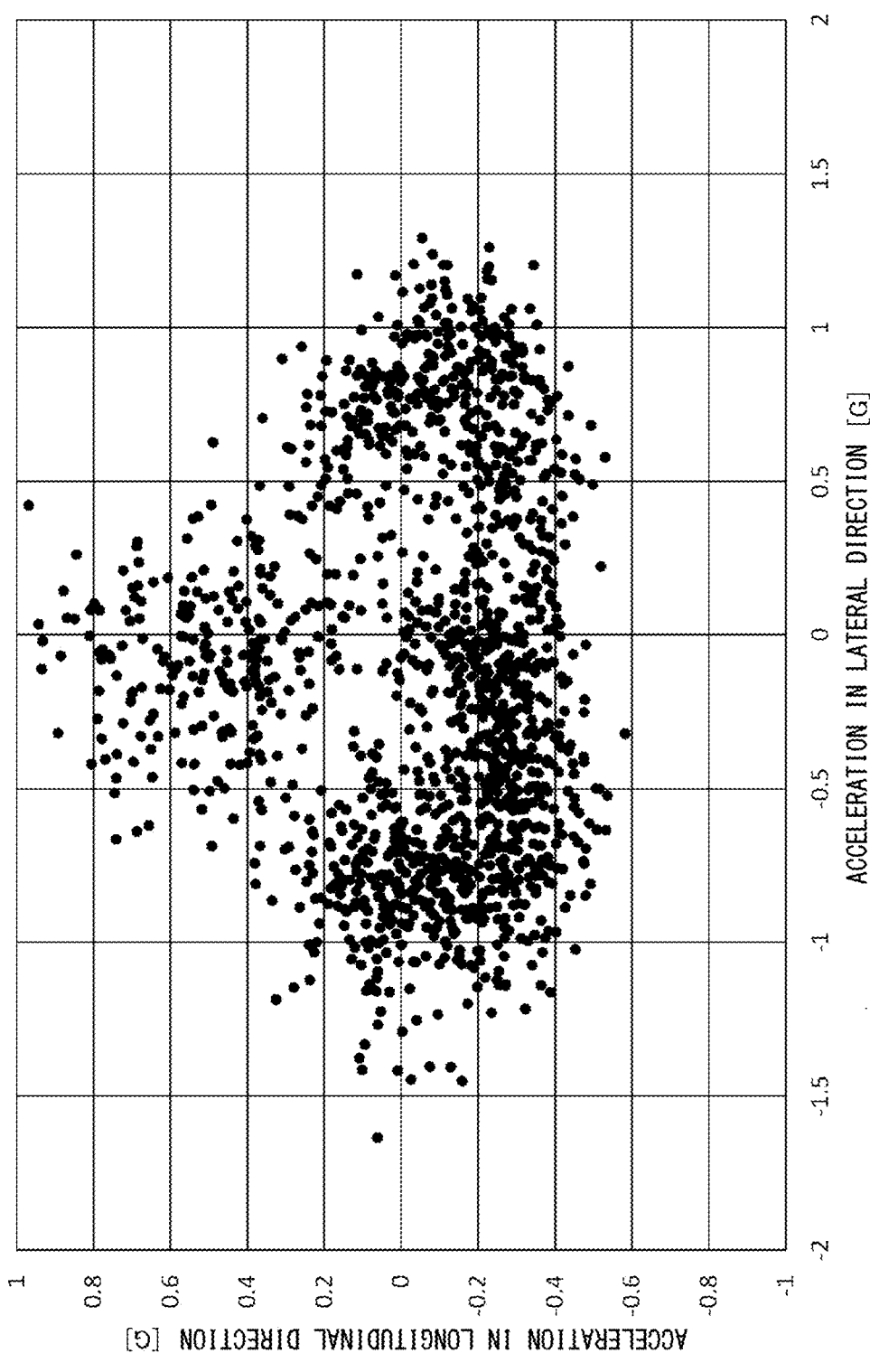
FIG. 19 is a graph showing an example of acceleration data acquired during vehicle driving.

FIG. 19 is a graph showing an example of acceleration data acquired during vehicle driving. In FIG. 19, the horizontal axis represents the lateral acceleration of the vehicle, the vertical axis represents the longitudinal acceleration of the vehicle, and the acceleration data is plotted.

The driving evaluation apparatus 50 includes a communication unit 55, a vehicle information acquisition unit 56, and an arithmetic processing unit 57. The driving evaluation apparatus 50 is an information processing apparatus such as a PC (personal computer). The parts in the driving evaluation apparatus 50 are implemented in hardware such as an electronic processing circuit comprised of an electronic element exemplified by a CPU of a computer and a mechanical component, and in software such as a computer program. FIG. 18 depicts functional blocks implemented by the cooperation of these parts. Therefore, it will be understood by those skilled in the art that the functional blocks may be implemented in a variety of manners by a combination of hardware and software.

The communication unit 55 is connected to the communication network 9 by wire or wirelessly, and communicates with the vehicle measurement apparatus 20. The vehicle information acquisition unit 56 acquires acceleration data produced in the vehicle 8 from the vehicle measurement apparatus 20 via the communication unit 55.

The arithmetic processing unit 57 includes a data extraction unit $57a$ and an evaluation value calculation unit $57b$. The data extraction unit $57a$ classifies the acceleration data acquired by the vehicle information acquisition unit 56 into data on the deceleration side and data on the acceleration side. The data extraction unit $57a$ extracts, from the data on the deceleration side and the data on the acceleration side, acceleration data belonging to a range defined by a predetermined threshold value.

The data extraction unit $57a$ extracts, from the data on the deceleration side and the data on the acceleration side, respectively, acceleration data in a range in which the absolute value of acceleration in the longitudinal direction of the vehicle is greater than a predetermined threshold value.

The evaluation value calculation unit 57b calculates the evaluation value E by integrating the acceleration data extracted by the data extraction unit 57a. The evaluation value calculation unit 57b integrates the acceleration data on the deceleration side (the magnitude of the synthesized acceleration vector in the horizontal direction) extracted by the data extraction unit 57a, and calculates the evaluation value Eb.

The evaluation value calculation unit 57b integrates the acceleration data on the acceleration side (the magnitude of the acceleration vector in the horizontal direction) extracted by the data extraction unit 57a, and calculates the evaluation value Ea. The evaluation value calculation unit 57b calculates the overall evaluation value E by adding the evaluation value Eb and the evaluation value Ea.

Figure 20:
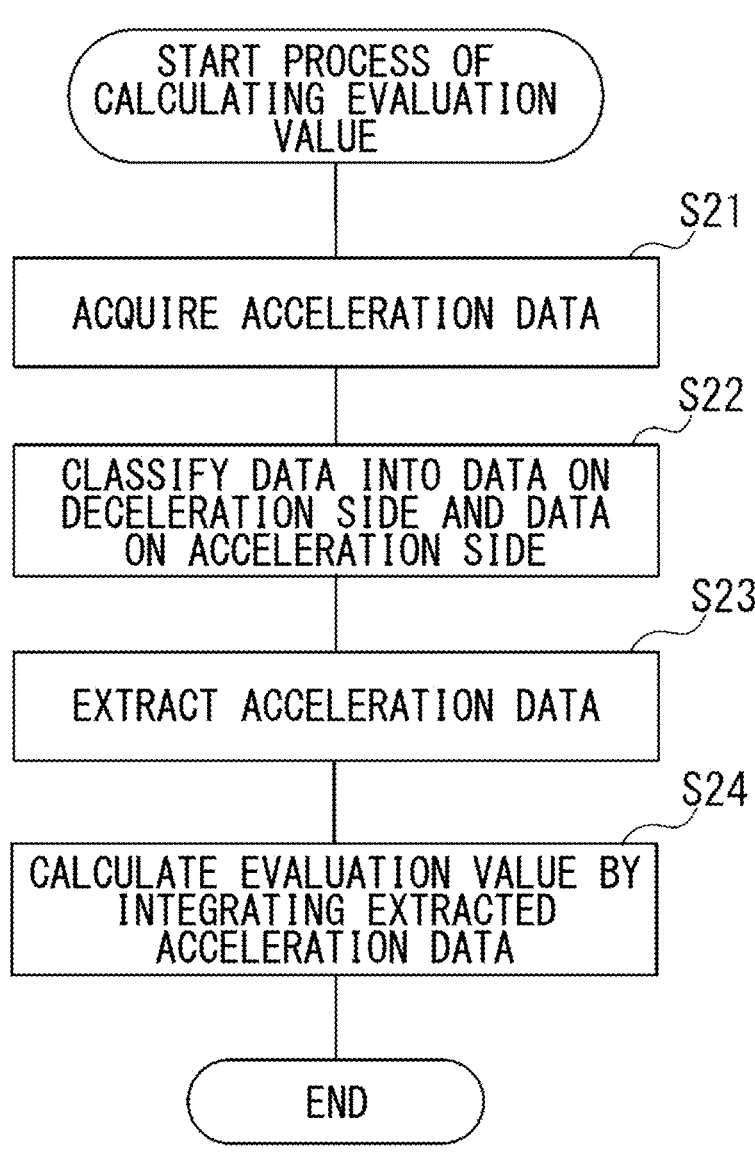
FIG. 20 is a flowchart showing steps for calculating the evaluation value by the driving evaluation apparatus.

The operation of the driving evaluation apparatus 50 will now be described. FIG. 20 is a flowchart showing steps for calculating the evaluation value by the driving evaluation apparatus 50. The vehicle information acquisition unit 56 of the driving evaluation apparatus 50 acquires acceleration data produced in the vehicle 8 from the vehicle measurement apparatus 20 via the communication unit 55 (S21). The data extraction unit 57a classifies the acceleration data into the data on the deceleration side and the data on the acceleration side (S22).

The data extraction unit 57a extracts, from the data on the deceleration side and the data on the acceleration side, acceleration data belonging to a range defined by a predetermined threshold value (S23). In this process, the data extraction unit 57a extracts, for example, acceleration data in a range in which the absolute value of acceleration in the longitudinal direction of the vehicle is greater than a predetermined threshold value.

The evaluation value calculation unit 57b calculates the evaluation values Eb, Ea, and E by integrating the acceleration data extracted in step S23 (S24), and ends the process. The overall evaluation value E is calculated by adding the evaluation value Eb on the deceleration side and the evaluation value Ea on the acceleration side.

The evaluation value calculation unit 57b extracts acceleration data belonging to a range defined by a predetermined threshold value, and calculates the evaluation values Eb, Ea, and E by integrating the extracted acceleration data. The evaluation values Eb and Ea reflect whether deceleration and acceleration is sufficiently performed by the driving operation performed while the vehicle is running on a circuit or the like. For example, the evaluation value Ea will be small when the accelerator operation is not sufficiently performed while the vehicle is being driven to run, and the evaluation value Ea will be large when the maximum acceleration is performed.

In addition, the overall evaluation value E, derived from adding the evaluation value Eb at the time of deceleration and the evaluation value Ea at the time of acceleration, is considered to be large when the driving skill is high and the lap time around the circuit is short and to be small when the driving skill is low and the lap time around the circuit is long.

The driving evaluation apparatus 50 can derive advantageous information that leads to improvement of the driving skill by extracting and integrating acceleration data belonging to a range defined by a predetermined threshold value and calculating the evaluation value. Further, the driving evaluation apparatus 50 can perform, by calculating the evaluation values Eb, Ea, and E, evaluation in each of a deceleration scene and an acceleration scene as well as detailed overall evaluation.

Variation

In the above-described embodiments 1 to 3, a vehicle caused to run around a circuit or the like has been mainly described as an example, but the driving evaluation system 100 can also be used in the case of driving on a lap course such as a test course, or driving on a course from one point to another.

Further, the driving evaluation system 100 shown in embodiments 1 to 3 may calculate the evaluation value and the index value for the entirety of a course on which the vehicle is driven or for each segmented part such as a curve or a straight line.

The features of the driving evaluation method, the driving evaluation apparatus 50, and the driving evaluation program according to the embodiment will be described. The driving evaluation method according to the embodiment includes a tire force acquisition step, a proportion calculation step, and an evaluation value calculation step. The tire force acquisition step acquires a tire force generating while the vehicle 8 is running. The proportion calculation step calculates a proportion value by dividing the tire force acquired by the tire force acquisition step by a load value. The evaluation value calculation step calculates an evaluation value by integrating the tire force for which the proportion value acquired by the proportion calculation step belongs to a range defined by a threshold value. According to this driving evaluation method, information that reflects the tire force and is advantageous regarding improvement of the driving skill can be derived.

Further, the evaluation value calculation step calculates the evaluation value by integrating the tire force extracted based on at least one of the weight balance or the drive wheel of the vehicle 8. According to this driving evaluation method, the tire force influential on the braking and driving of the vehicle can be extracted.

Further, the evaluation value calculation step calculates, when the vehicle 8 is rear-wheel driven, the evaluation value by integrating the tire force in the front tire at the time of braking and the tire force in the rear tire at the time of driving. According to this driving evaluation method, the influential tire force can be extracted according to the drive wheel.

Further, the evaluation value calculation step calculates, when the vehicle 8 is front-wheel driven, the evaluation value by integrating the tire force in the front tire at the time of braking and the tire force in the front tire at the time of driving. According to this driving evaluation method, the influential tire force can be extracted according to the drive wheel.

Further, the proportion calculation step calculates the proportion value by dividing longitudinal and lateral tire forces by the load value. According to this driving evaluation method, it is possible to distinguish between the time of braking time and the time of driving by referring to the proportion value Rx in the longitudinal direction, and to extract the tire force influential on vehicle driving by referring to the proportion values Rx and Ry equal to or higher than predetermined levels.

The driving evaluation apparatus 50 includes a tire force acquisition unit 52, a proportion calculation unit 53a, and an evaluation value calculation unit 53b. The tire force acquisition unit 52 acquires a tire force generating while the vehicle 8 is running. The proportion calculation unit 53a calculates a proportion value by dividing the tire force acquired by the tire force acquisition unit 52 by a load value. The evaluation value calculation unit 53b calculates an evaluation value by integrating the tire force for which the proportion value acquired by the proportion calculation unit 53*a* belongs to a range defined by a threshold value. Accordingly, the driving evaluation apparatus 50 can derive information that reflects the tire force and is advantageous regarding improvement of the driving skill.

The driving evaluation program on a non-volatile recording medium for driving evaluation includes computer-implemented modules including a tire force acquisition module, a proportion calculation module, and an evaluation value calculation module. The tire force acquisition module acquires a tire force generating while the vehicle 8 is running. The proportion calculation module calculates a proportion value by dividing the tire force acquired by the tire force acquisition module by a load value. The evaluation value calculation module calculates an evaluation value by integrating the tire force for which the proportion value acquired by the proportion calculation module belongs to a range defined by a threshold value. According to this driving evaluation program, information that reflects the tire force and is advantageous regarding improvement of the driving skill can be derived.

The driving evaluation method includes a vehicle information acquisition step, a data extraction step, and an evaluation value calculation step. The vehicle information acquisition step acquires information measured in a vehicle including acceleration data for the vehicle 8. The data extraction step extracts, of the acceleration data acquired by the vehicle information acquisition step, acceleration data belonging to a range defined by a predetermined threshold value. The evaluation value calculation step calculates an evaluation value by integrating the acceleration data extracted by the data extraction step. According to this driving evaluation method, advantageous information regarding improvement of the driving skill can be derived.

The driving evaluation method according to the embodiment includes a tire force acquisition step, an evaluation value calculation step, and an index value calculation step. The tire force acquisition step acquires a tire force generating while the vehicle 8 is running. The evaluation value calculation step calculates an evaluation value by integrating the tire force acquired by the tire force acquisition step. The index value calculation step calculates an index value from the evaluation value calculated by the evaluation value calculation step, based on a predetermined reference value. According to this driving evaluation method, information that reflects the tire force and is advantageous regarding improvement of the driving skill can be derived.

Further, the index value calculation step determines a proportion of the evaluation value, calculated by the evaluation value calculation step, relative to the reference value as the index value. According to this driving evaluation method, it is possible to determine the index value according to the proportion of the evaluation value relative to the reference value and provide the index value in an easy-to-recognize manner.

Further, the index value calculation step calculates an index value at the time of braking the vehicle 8 and an index value at the time of driving the vehicle 8. According to this driving evaluation method, it is possible to provide information on the evaluation of tire force in brake and accelerator operations in an easy-to-recognize manner.

The method further includes an improvement determination step of determining a detail of improvement of a driving skill based on the index value calculated by the index value calculation step. According to this driving evaluation method, it is possible to provide information on the detail of improvement related to the driving skill in a format that is easy to recognize, based on the index value.

The driving evaluation apparatus 50 includes a tire force acquisition unit 52, an evaluation value calculation unit 53*b*, and an index value calculation unit 53*c*. The tire force acquisition unit 52 acquires a tire force generating while the vehicle 8 is running. The evaluation value calculation unit 53*b* calculates an evaluation value by integrating the tire force acquired by the tire force acquisition unit 52. The index value calculation unit 53*c* calculates an index value from the evaluation value calculated by the evaluation value calculation unit 53*b*, based on a predetermined reference value. Accordingly, the driving evaluation apparatus 50 can derive information that reflects the tire force and is advantageous regarding improvement of the driving skill.

The driving evaluation program on a non-volatile recording medium for driving evaluation includes computer-implemented modules including a tire force acquisition module, an evaluation value calculation module, and an index value calculation module. The tire force acquisition module acquires a tire force generating while the vehicle 8 is running. The evaluation value calculation module calculates an evaluation value by integrating the tire force acquired by the tire force acquisition module. The index value calculation module calculates an index value from the evaluation value calculated by the evaluation value calculation module, based on a predetermined reference value. According to this driving evaluation program, information that reflects the tire force and is advantageous regarding improvement of the driving skill can be derived.

Given above is a description based on the embodiment of the present disclosure. The embodiment is intended to be illustrative only and it will be understood to those skilled in the art that variations and modifications are possible within the claim scope of the present disclosure and that such variations and modifications are also within the claim scope of the present disclosure. Accordingly, the description and drawings in the specification shall be interpreted as being illustration instead of limitation.

What is claimed is:

1. A driving evaluation method that occurs in real time, the method comprising:

driving a vehicle on a course;

sensing tire forces using sensors mounted on the vehicle;

acquiring tire force using a tire force acquisition unit within a driving evaluation apparatus;

calculating a proportion value in real time by using the obtained tire force, dividing the tire force by a load value, the calculating of the proportion value carried out by the proportion calculation unit within the driving evaluation apparatus;

calculating an evaluation value in real time by obtaining the vehicle's sensed tire force, the tire force corresponding to the vehicle's measured accelerations and decelerations, integrating the tire force for which the proportion value acquired by the calculating of the proportion value within a range defined by a threshold value, the calculating of the evaluation value carried out by the evaluation value calculation unit within the driving evaluation apparatus;

calculating an index value in real time from the evaluation value calculated by the calculating of the evaluation value, the index value based on a predetermined reference value, the index value calculated using an index value calculation unit within the driving evaluation apparatus;

and displaying the index value calculated by the calculating of the index value on a display, the index value corresponding to values associated with improvements required of the vehicle's tires, and improvements required for a driver's optimal acceleration and braking.

2. The driving evaluation method according to claim 1, wherein the calculating of the evaluation value calculates the evaluation value by integrating the tire force extracted based on at least one of a weight balance or a drive wheel of the vehicle.

3. The driving evaluation method according to claim 1, wherein the calculating of the evaluation value calculates, when the vehicle is rear-wheel driven, the evaluation value by integrating the tire force in a front tire at the time of braking and the tire force in a rear tire at the time of driving.

4. The driving evaluation method according to claim 1, wherein the calculating of the evaluation value calculates, when the vehicle is front-wheel driven, the evaluation value by integrating the tire force in a front tire at the time of braking and the tire force in the front tire at the time of driving.

5. The driving evaluation method according to claim 1, wherein the calculating of the proportion value calculates the proportion value by dividing longitudinal and lateral tire forces by the load value.

6. The driving evaluation method according to claim 1, wherein the acquiring of the tire force acquires the tire force calculated by using a learning type arithmetic operation model that receives, in an input layer, an input of data having periodicity per rotation of the tire and outputs the tire force from an output layer.

7. The driving evaluation method according to claim 1, wherein the calculating of the index value determines a proportion of the evaluation value, calculated by the calculating of the evaluation value, relative to the reference value as the index value.

8. The driving evaluation method according to claim 1, wherein the calculating of the index value calculates an index value at the time of braking the vehicle and an index value at the time of driving the vehicle.

9. The driving evaluation method according to claim 1, further comprising: determining a detail of improvement of a driving skill based on the index value calculated by the calculating of the index value.

10. The driving evaluation method according to claim 1, wherein the displaying displays a lap time on the display along with the index value.

11. A non-volatile recording medium for real time driving evaluation, the recording medium encoded with a program, the program comprising computer-implemented modules including:

a tire force acquisition module that acquires a tire force generated in real time, while a vehicle is running;

an evaluation value calculation module that calculates, in real time, an evaluation value by integrating the tire force acquired by the tire force acquisition module; and an index value calculation module that calculates, in real time, an index value from the evaluation value calculated by the evaluation value calculation module, based on a predetermined reference value; and calculate the index value and present the index value on a display, the index value corresponding to values associated with improvements required of the vehicle's tires, and improvements required for a driver's optimal acceleration and braking.

12. A driving evaluation method comprising:

driving a vehicle on a course in real time;

acquiring information measured in the vehicle including acceleration data for the vehicle, the acceleration data acquiring the acceleration data as the vehicle is driven;

extracting, using an evaluation value calculation unit, the acceleration data, the acceleration data belonging to a range defined by a predetermined threshold value; and calculating, using the evaluation value calculation unit an evaluation value for the acceleration data by integrating the acceleration data extracted by the extracting of the acceleration data;

the driving evaluation method further comprising:

acquiring, using sensors, a tire force generating while a vehicle is running;

calculating a proportion value by acquiring the tire force and dividing the tire force by a load value, the calculating of the proportion value carried out by a proportion calculation unit within a driving evaluation apparatus; and calculating an evaluation value for the tire force by integrating the tire force for which the proportion value acquired by the calculating of the proportion value within a range defined by a threshold value, the calculating of the evaluation value carried out by the evaluation value calculation unit within the driving evaluation apparatus;

calculating an index value from the evaluation value for the tire force calculated by the calculating of the evaluation value, based on a predetermined reference value;

calculating an index value from the evaluation value calculated by the calculating of the evaluation value, based on a predetermined reference value, the index value calculated using an index value calculation unit within the driving evaluation apparatus; and displaying the index value calculated by the calculating of the index value on a display, the index value corresponding to values associated with improvements required of the vehicle's tires, and improvements required for a driver's optimal acceleration and braking.

13. The driving evaluation method according to claim 12, wherein the calculating of the evaluation value for the acceleration data categorizes data into data on a deceleration side and data on an acceleration side, calculating an evaluation value derived from integrating the data on the deceleration side and an evaluation value derived from integrating the data on the acceleration side;

adding an integrated value of the data on the deceleration side and an integrated value of the data on the acceleration side.

* * * * *